United States Patent
Funahashi et al.

(10) Patent No.: US 12,055,188 B2
(45) Date of Patent: Aug. 6, 2024

(54) FIXED TYPE CONSTANT VELOCITY UNIVERSAL JOINT

(71) Applicant: NTN CORPORATION, Osaka (JP)

(72) Inventors: Masashi Funahashi, Shizuoka (JP); Teruaki Fujio, Shizuoka (JP)

(73) Assignee: NTN CORPORATION, Osaka (JP)

( * ) Notice: Subject to any disclaimer, the term of this patent is extended or adjusted under 35 U.S.C. 154(b) by 399 days.

(21) Appl. No.: 17/599,770

(22) PCT Filed: Mar. 16, 2020

(86) PCT No.: PCT/JP2020/011404
§ 371 (c)(1),
(2) Date: Sep. 29, 2021

(87) PCT Pub. No.: WO2020/203215
PCT Pub. Date: Oct. 8, 2020

(65) Prior Publication Data
US 2022/0056960 A1    Feb. 24, 2022

(30) Foreign Application Priority Data

Apr. 5, 2019 (JP) ................................. 2019-072801

(51) Int. Cl.
*F16D 3/224* (2011.01)
*F16D 3/2237* (2011.01)
(Continued)

(52) U.S. Cl.
CPC ........... *F16D 3/224* (2013.01); *F16D 3/2237* (2013.01); *F16D 2003/22309* (2013.01); *F16D 3/2245* (2013.01); *Y10S 464/906* (2013.01)

(58) Field of Classification Search
CPC ...... F16D 3/224; F16D 3/2237; F16D 3/2245; F16D 2003/22309; Y10S 464/906
(Continued)

(56) References Cited

U.S. PATENT DOCUMENTS

2008/0064509 A1* 3/2008 Kadota ................. F16D 3/2245
464/144
2009/0269129 A1 10/2009 Harnischfeger
(Continued)

FOREIGN PATENT DOCUMENTS

EP  2 594 821   5/2013
JP  2006-336773 12/2006
(Continued)

OTHER PUBLICATIONS

Extended European Search Report issued Dec. 9, 2022 in corresponding European Patent Application No. 20785388.8.
(Continued)

*Primary Examiner* — Greg Binda
(74) *Attorney, Agent, or Firm* — Wenderoth, Lind & Ponack, L.L.P.

(57) ABSTRACT

A fixed type constant velocity universal joint has outer joint member track grooves each with a raceway center line that includes an arc-shaped portion having a curvature center that has no offset with respect to a joint center in an axial direction. The track grooves are formed such that adjacent track grooves are inclined in opposite directions. The joint also has inner joint member track grooves that are each formed to be mirror-symmetric with a corresponding one of the outer joint member track grooves with a plane including the joint center and being orthogonal to the axis of the joint at an operating angle of 0°. When at a large operating angle, an operating angle at which a torque transmission ball loses contact with the inner joint member track groove is larger than that at which the torque transmission ball loses contact with the outer joint member track groove.

6 Claims, 11 Drawing Sheets

(51) Int. Cl.
*F16D 3/223* (2011.01)
*F16D 3/2245* (2011.01)

(58) Field of Classification Search
USPC .......................................................... 464/144
See application file for complete search history.

(56) References Cited

U.S. PATENT DOCUMENTS

2014/0309045 A1   10/2014  Hirukawa et al.
2018/0149207 A1*  5/2018   Asano ................... F16D 3/2245
2021/0033152 A1*  2/2021   Fujio ..................... F16D 3/2237

FOREIGN PATENT DOCUMENTS

| JP | 2008-75820  | 4/2008 |
| JP | 2010-19399  | 1/2010 |
| JP | 2012-17844  | 1/2012 |
| JP | 4885236     | 2/2012 |
| JP | 2013-104432 | 5/2013 |
| WO | 2007/079762 | 7/2007 |

OTHER PUBLICATIONS

International Preliminary Report on Patentability and Written Opinion of the International Searching Authority issued Sep. 28, 2021 in International (PCT) Application No. PCT/JP2020/011404.
International Search Report issued Jun. 9, 2020 in International (PCT) Application No. PCT/JP2020/011404.

* cited by examiner

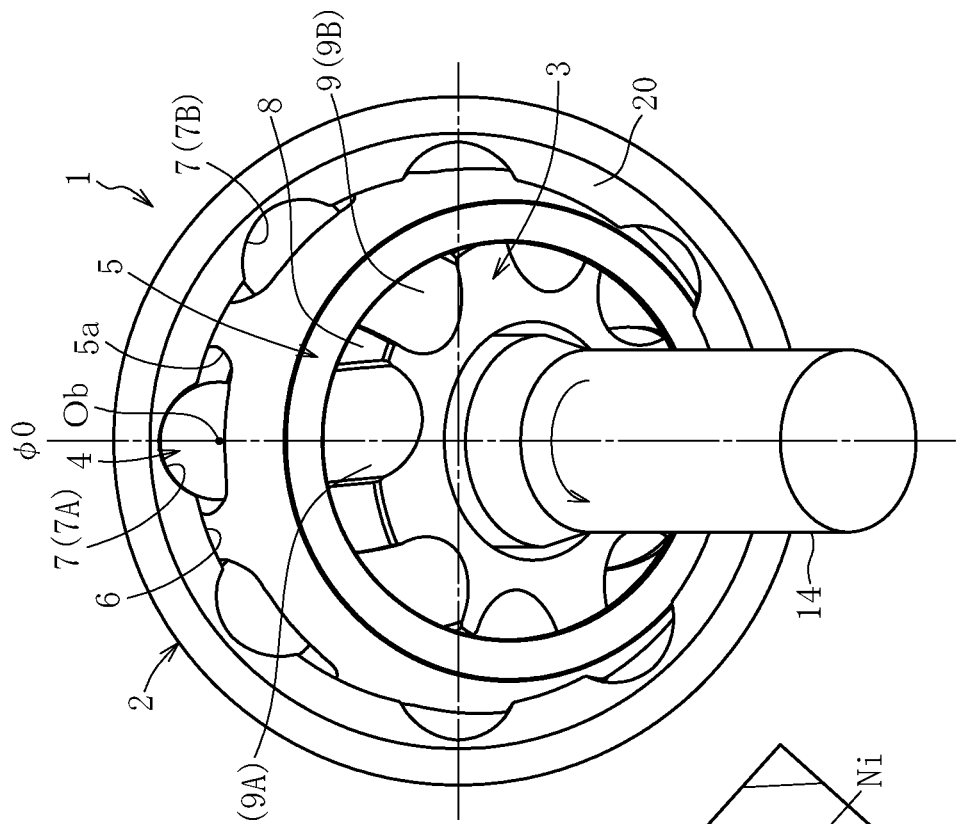
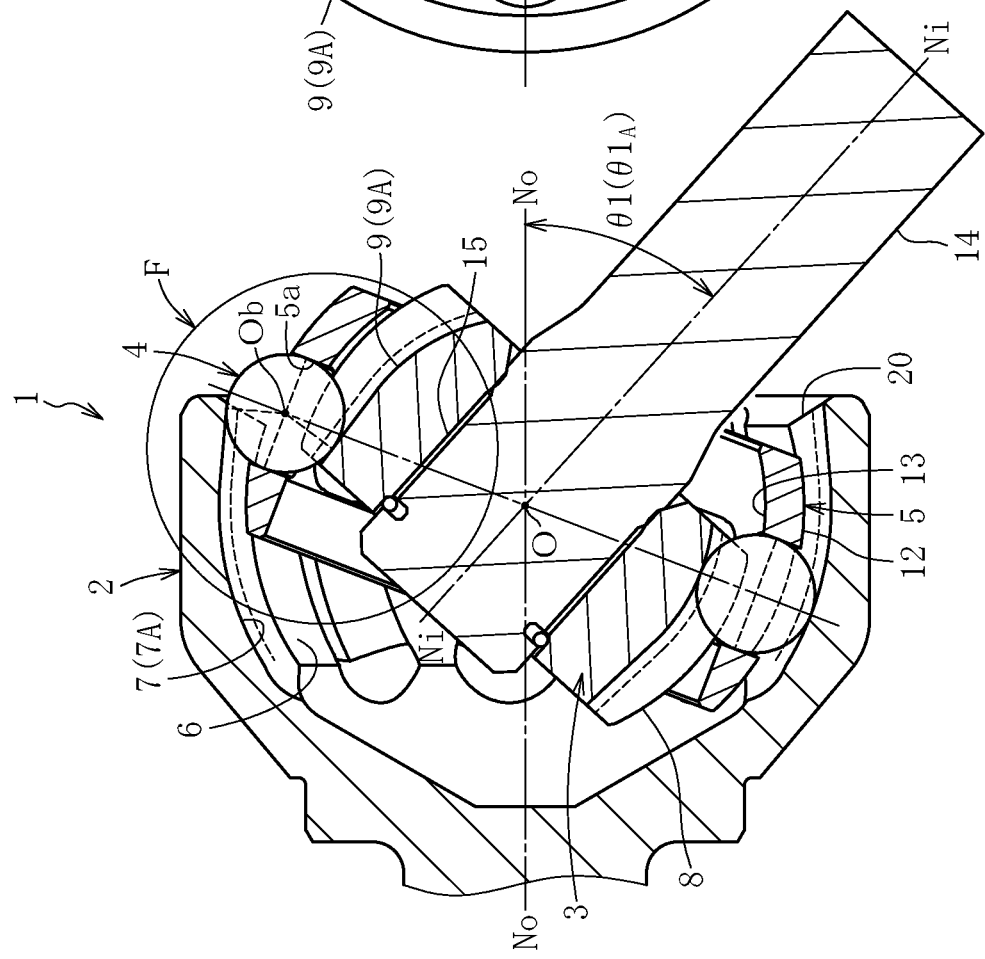

FIXED TYPE CONSTANT VELOCITY UNIVERSAL JOINT

TECHNICAL FIELD

The present invention relates to a fixed type constant velocity universal joint.

BACKGROUND ART

In a constant velocity universal joint, which is used to construct a power transmission system for automobiles and various industrial machines, two shafts on a driving side and a driven side are coupled to each other to allow torque transmission therebetween, and rotational torque can be transmitted at a constant velocity even when the two shafts form an operating angle. The constant velocity universal joint is roughly classified into a fixed type constant velocity universal joint that allows only angular displacement, and a plunging type constant velocity universal joint that allows both the angular displacement and axial displacement. In a drive shaft configured to transmit power from an engine of an automobile to a driving wheel, for example, the plunging type constant velocity universal joint is used on a differential side (inboard side), and the fixed type constant velocity universal joint is used on a driving wheel side (outboard side).

As functions required for a fixed type constant velocity universal joint for a drive shaft of an automobile, it is important to include a large operating angle, which conforms to the steering of wheels, and a strength suitable for the large operating angle. In the related art, in general, a Rzeppa constant velocity universal joint (BJ type) has a maximum operating angle of 47°, and an undercut-free constant velocity universal joint (UJ type) has a maximum operating angle of 50°. From the viewpoint of improving the turning performance of an automobile and improving ease of tight turns, there have been increasing demands for a maximum operating angle larger than 50°. In order to meet those demands, fixed type constant velocity universal joints of various structure have been proposed.

In Patent Document 1, it is described that, in a related-art fixed type constant velocity universal joint, at the time of the maximum operating angle, regarding a torque transmission ball (hereinafter simply referred to as "ball") located at a phase angle (phase angle 0°) at which the ball moves most toward an opening side of the outer joint member, a ratio of an axis parallel distance between a center of the ball and a joint center to an axis parallel distance between the center of the ball and an opening conical surface of the outer joint member is set to be less than 2.9, thereby being capable of maintaining the function even at the time of the maximum operating angle. Further, it is also described that, in a case in which the operating angle is taken so that the ball projects to such an extent of losing a contact from the track groove of the outer joint member, the function can be maintained by setting the ratio to be less than 2.2.

In Patent Document 2, as a countermeasure to be taken when a ball that has lost a contact with a track groove returns to any one of the track groove of an outer joint member and the track groove of an inner joint member, there is proposed a configuration in which an axial end portion of any one of the track groove of the outer joint member and the track groove of the inner joint member is formed into such a shape as to prevent the ball from transmitting torque. With this configuration, damage to an end portion of the outer joint member can be prevented.

In Patent Document 3, there is proposed not a fixed type constant velocity universal joint having the maximum operating angle set to be larger than a hitherto-adopted operating angle (50°), but a fixed type constant velocity universal joint having high efficiency and having the structure in which a raceway center line of each of track grooves of an outer joint member and a raceway center line of each of track grooves of an inner joint member each include an arc-shaped portion having a curvature center that has no offset with respect to a joint center O in an axial direction, and in which the arc-shaped raceway center lines are inclined in opposite directions in a circumferential direction.

PRIOR ART DOCUMENTS

Patent Documents

Patent Document 1: JP 4885236 B2
Patent Document 2: US 2009/0269129 A1
Patent Document 3: JP 2013-104432 A

SUMMARY OF THE INVENTION

Problems to be Solved by the Invention

When a fixed type constant velocity universal joint having a maximum operating angle larger than that of the hitherto-adopted operating angle (50°) is to be used, it is required that a length of the outer joint member be set short so as to prevent interference between an intermediate shaft and the outer joint member. However, as a result, track grooves of the outer joint member become shorter, and a ball located around the phase angle of 0° comes off the track groove and loses a contact.

In Patent Document 1, through setting of the ratio of the axial distance between the center of the ball and the joint center at a phase (phase angle of 0°) at which the ball projects most from an opening-side end portion of the outer joint member at the time of the maximum operating angle, to the axial distance between the center of the ball and the opening conical surface of the outer joint member, the ball can be prevented from being dropped off from the cage and the outer joint member. However, the track groove of the inner joint member remains on the back side, and hence the ball moves along the track groove of the inner joint member toward a radially outer side of the cage. Thus, there is a risk in that the ball loses a contact with the cage depending on a shape of the track groove such as an S shape or a linear shape. Accordingly, it has been found that retention of the ball is lost and noise is generated.

In Patent Document 2, through adoption of the configuration in which the track groove is formed into such a shape as to prevent the ball from transmitting torque (or to bear no load) when the ball that has lost a contact with the track groove of the outer joint member returns to the track groove of the outer joint member again, damage to the opening-side end portion of the outer joint member can be prevented. However, in a case in which the track groove is formed into such a shape as to bear no load of the ball when the ball returns to the track groove of the outer joint member again, the balls located at other phases bear the load. In particular, the ball that has moved most toward the back side of the outer joint member, that is, the ball located at a phase angle of 180° bears most of this load. Accordingly, it has been found that the load to be applied to the ball is increased, with the result that the outer joint member and the inner joint member may be damaged early.

The fixed type constant velocity universal joint of Patent Document 3 is reduced in torque loss and generation of heat, and has high efficiency. However, there is an unknown problem when the fixed type constant velocity universal joint is used at a large operating angle larger than the hitherto-adopted operating angle (50°). This problem is studied and inspected as described later.

In view of the problems described above, the present invention has an object to provide a fixed type constant velocity universal joint, which has the maximum operating angle set to be larger than the hitherto-adopted operating angle (50°), has an operation mode in which, when a large operating angle is taken, a ball loses a contact in a range of a phase (phase angle of 0°) at which the ball projects from an outer joint member, and is capable of securing a constant velocity characteristic, transmission efficiency, and durability.

Solutions to the Problems

The inventors of the present invention have conducted extensive studies and inspections for the problems described above, and obtained the following knowledge and ideas, thereby achieving the present invention.

(1) Disturbance of a Balance of Forces in a Joint when a Ball Loses a Contact

When the fixed type constant velocity universal joint is used at a large operating angle larger than the hitherto-adopted operating angle (50°), as described above, the track grooves of the outer joint member are reduced in length, and the ball located around the phase angle of 0° comes off the track groove and loses a contact. Further, in the phase range in which the ball loses a contact with the track groove, a contact force between the ball and the track groove of the outer joint member, a contact force between the ball and the track groove of the inner joint member, and a force applied to the cage by the ball are lost, and the other balls bear the load, with the result that a balance of internal forces is disturbed. It has been found that, particularly in a type in which a curvature center of the track groove is offset in an axial direction (hereinafter, also referred to as "axial track offset type"), such as a Rzeppa constant velocity universal joint (BJ type) or an undercut-free constant velocity universal joint (UJ type), a balance of forces in the constant velocity universal joint is significantly disturbed.

(2) Consideration to Disturbance of the Balance of Forces in the Joint

In the fixed type constant velocity universal joint of the axial track offset type, the curvature center of the track groove of the outer joint member is offset with respect to the joint center O toward the opening side of the outer joint member. Meanwhile, the curvature center of the track groove of the inner joint member is offset in a direction opposite to that of the curvature center of the track groove of the outer joint member. The ball is arranged in a wedge-shaped space opened toward the opening side and defined between the track groove of the outer joint member and the track groove of the inner joint member, and is positioned by the cage.

Consideration is given as follows. When torque is applied at a small angle about a normal operating angle, by component forces of the contact forces between the ball and the track groove of the outer joint member and between the ball and the track groove of the inner joint member, each ball pushes the cage in the same direction. Thus, a spherical outer peripheral surface and a spherical inner peripheral surface of the cage are firmly brought into contact with a spherical inner peripheral surface of the outer joint member and a spherical outer peripheral surface of the inner joint member, respectively. When torque is applied in a range of from a medium angle to a large angle, there are variations in magnitude of the contact forces between each ball and the track groove of the outer joint member and between each ball and the track groove of the inner joint member, and there are also variations in magnitude of the forces of pushing the cage by the balls. Thus, a balance of a moment applied to the cage is also slightly displaced from a bisecting plane. Moreover, at a large operating angle at which the ball loses a contact with the track groove of the outer joint member, the number of the balls bearing the load is reduced. As a result, the balance of the moment applied to the cage significantly changes so that the cage is significantly displaced from the bisecting plane. Along with this, there is a fear in that a constant velocity characteristic and transmission efficiency are reduced, and strength of the cage is also significantly reduced.

(3) Focus and Inspections

Based on the result of consideration described above, a focus is given to a fixed type constant velocity universal joint of a cross track groove type that is excellent in balance of forces applied from balls to a cage. In the fixed type constant velocity universal joint of the cross track groove type, track grooves of an outer joint member each include an arc-shaped portion having a curvature center that has no offset in an axial direction, and are inclined in a circumferential direction with respect to an axis of the joint. Further, the track grooves are formed with such inclination directions that the track grooves adjacent to each other are inclined in opposite directions. A raceway center line of each track groove of an inner joint member is mirror-symmetric with a raceway center line of the track groove of the outer joint member. The balls are arranged at intersecting portions between the track grooves of the outer joint member and the track grooves of the inner joint member.

In the fixed type constant velocity universal joint of the cross track groove type, when torque is applied in a range of the normal operating angle having a small angle and a range of from a medium angle to a large angle in which the balls are brought into a contact state with respect to the track grooves, owing to the structure in which the balls basically generate forces to push the cage in opposite directions in the adjacent track grooves, the moment and the forces applied to the cage by the balls are balanced. In the range of from the medium angle to the large angle, there are variations in magnitude of contact forces between each ball and the track groove of the outer joint member and between each ball and the track groove of the inner joint member. However, as compared to the related-art axial track offset type, the moment and the forces applied to the cage by the balls are balanced, and hence the cage is stable near the bisecting plane. Moreover, it has been found that, even at the large operating angle at which the ball loses a contact with the track groove of the outer joint member, as compared to the related-art axial track offset type, the moment and the forces applied to the cage by the balls still act so as to be balanced, and hence the cage is not significantly displaced from the bisecting plane.

Based on the results of inspections described above, a conclusion is drawn as follows. In the fixed type constant velocity universal joint of the cross track groove type, even under a state in which the ball loses a contact with the track groove of the outer joint member, the cage is not significantly displaced from the bisecting plane, thereby being capable of minimizing reduction in constant velocity characteristic and transmission efficiency, and minimizing changes of internal forces.

(4) Novel Ideas

The inventors of the present invention have arrived at an idea of using the fixed type constant velocity universal joint of the cross track groove type as a base to adopt as the fixed type constant velocity universal joint having the maximum operating angle set to be larger than the hitherto-adopted operating angle (50°) and having the operation mode in which, when the large operating angle is taken, the ball loses a contact at the phase angle (around the phase angle of 0°) at which the ball projects from the outer joint member. After the arrival at the idea, as a result of extensive studies, the inventors of the present invention hit on an idea of preventing the ball from being dropped off from the cage through suppression of a movement amount by which the ball is pushed out from the cage to a radially outer side under a state in which the ball loses a contact in the fixed type constant velocity universal joint of the cross track groove type, and further hit on an idea of preventing damage to the opening-side end portion of the outer joint member through suppression of increase in internal forces when the ball returns to the track groove of the outer joint member, thereby achieving the present invention.

As a technical measure to achieve the object described above, according to the present invention, there is provided a fixed type constant velocity universal joint, comprising: an outer joint member, which has a plurality of track grooves being formed in a spherical inner peripheral surface of the outer joint member and extending substantially in an axial direction, and has an opening side and a back side apart from each other in the axial direction; an inner joint member, which has a plurality of track grooves being formed in a spherical outer peripheral surface of the inner joint member and extending substantially in the axial direction so as to be opposed to the track grooves of the outer joint member; torque transmission balls incorporated in pairs of the track grooves opposed to each other; and a cage configured to retain the torque transmission balls in pockets, the cage comprising: a spherical outer peripheral surface to be guided by the spherical inner peripheral surface of the outer joint member; and a spherical inner peripheral surface to be guided by the spherical outer peripheral surface of the inner joint member, wherein a raceway center line X of the track groove of the outer joint member comprises at least an arc-shaped portion having a curvature center that has no offset with respect to a joint center O in the axial direction, wherein a plane M including the raceway center line X and the joint center O is inclined with respect to an axis N-N of the joint, and the track groove is formed with such an inclination direction of the plane M that the track grooves adjacent to each other in a circumferential direction are inclined in opposite directions, wherein a raceway center line Y of the track groove of the inner joint member is formed so as to be mirror-symmetric with the raceway center line X of the paired track groove of the outer joint member with a plane P including the joint center O and being orthogonal to the axis N-N of the joint in a state of an operating angle of 0° as a reference, and wherein, when a large operating angle is taken, an operating angle θ2 at which the torque transmission ball loses a contact with the track groove of the inner joint member is larger than an operating angle θ1 at which the torque transmission ball loses a contact with the track groove of the outer joint member.

With the configuration described above, in the fixed type constant velocity universal joint having the maximum operating angle set to be larger than the hitherto-adopted operating angle (50°), and having the operation mode in which, when the large operating angle is taken, the ball loses a contact at the phase angle (around the phase angle of 0°) at which the ball projects from the outer joint member, the fixed type constant velocity universal joint capable of securing a constant velocity characteristic, transmission efficiency, and durability can be achieved.

Specifically, it is preferred that the raceway center line X of the track groove of the outer joint member described above comprise the arc-shaped portion having the curvature center that has no offset with respect to the joint center O in the axial direction, and a portion different in shape from the arc-shaped portion. It is preferred that the arc-shaped portion and the portion different in shape from the arc-shaped portion be smoothly connected to each other at a connection point A. It is preferred that the connection point A be located more on the opening side of the outer joint member than the joint center O. With this, a constant velocity characteristic, transmission efficiency, and durability can be secured. In addition, a length of a track groove that is effective in keeping a contact, and a size of a wedge angle at the time of a large operating angle can be adjusted.

When the portion different in shape described above is linear, an effective track length can be increased.

It is preferred that the operating angle θ2 at which the torque transmission ball loses a contact with the track groove of the inner joint member be larger, by 3° or more, than the operating angle θ1 at which the torque transmission ball loses a contact with the track groove of the outer joint member. With this, while the inner joint member is reduced in weight and size, a load of the ball can be borne on the track groove of the inner joint member when the ball returns to the track groove of the outer joint member. Accordingly, without increasing the internal forces, damage to the opening-side end portion of the outer joint member can be prevented, thereby being capable of improving strength and durability.

It is preferred that an upper limit of the operating angle θ2 at which the torque transmission ball loses a contact with the track groove of the inner joint member be set to a value enabling the torque transmission ball to keep a contact with the pocket of the cage. With this, the balls are reliably retained in the pockets of the cage, thereby being capable of preventing generation of noise.

When the number of the torque transmission balls described above is set to be equal to or larger than eight, high efficiency and reduction in weight and size can be achieved.

Effects of the Invention

According to the present invention, it is possible to achieve the fixed type constant velocity universal joint, which has the maximum operating angle set to be larger than the hitherto-adopted operating angle (50°), has the operation mode in which, when a large operating angle is taken, the ball loses a contact in a range of a phase (phase angle of 0°) at which the ball projects from the outer joint member, and is capable of securing a constant velocity characteristic, transmission efficiency, and durability.

BRIEF DESCRIPTION OF DRAWINGS

FIG. 1b is a right-side view of FIG. 1a.

FIG. 2a is a longitudinal sectional view for illustrating an outer joint member of FIG. 1a.

FIG. 2b is a right-side view of FIG. 2a.

FIG. 3a is a front view for illustrating an inner joint member of FIG. 1a.

FIG. 3b is a right-side view of FIG. 3a.

FIG. 4 is an enlarged transverse sectional view for illustrating one torque transmission ball and track grooves taken along the line P-P of FIG. 1a.

FIG. 6b is a right-side view of FIG. 6a.

FIG. 7 is an enlarged longitudinal sectional view for illustrating the portion E of FIG. 6a.

FIG. 10a is a longitudinal sectional view for illustrating a state in which the torque transmission ball loses a contact with the track groove of the outer joint member when the fixed type constant velocity universal joint of FIG. 1a and FIG. 1b takes a large operating angle.

FIG. 10b is a right-side view of FIG. 10a.

FIG. 12 is an enlarged longitudinal sectional view for illustrating the portion F of FIG. 10a.

FIG. 13b is a right-side view of FIG. 13a.

FIG. 15 is an enlarged longitudinal sectional view for illustrating the portion H of FIG. 13a.

EMBODIMENTS OF THE INVENTION

Figure 1B:
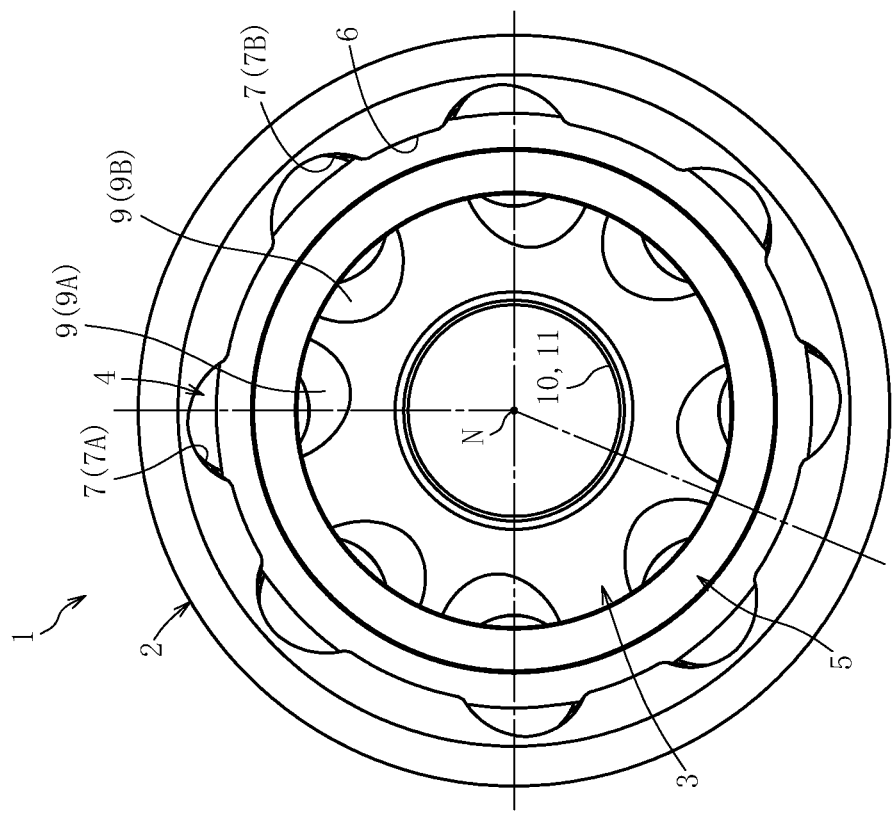
Figure 1A:
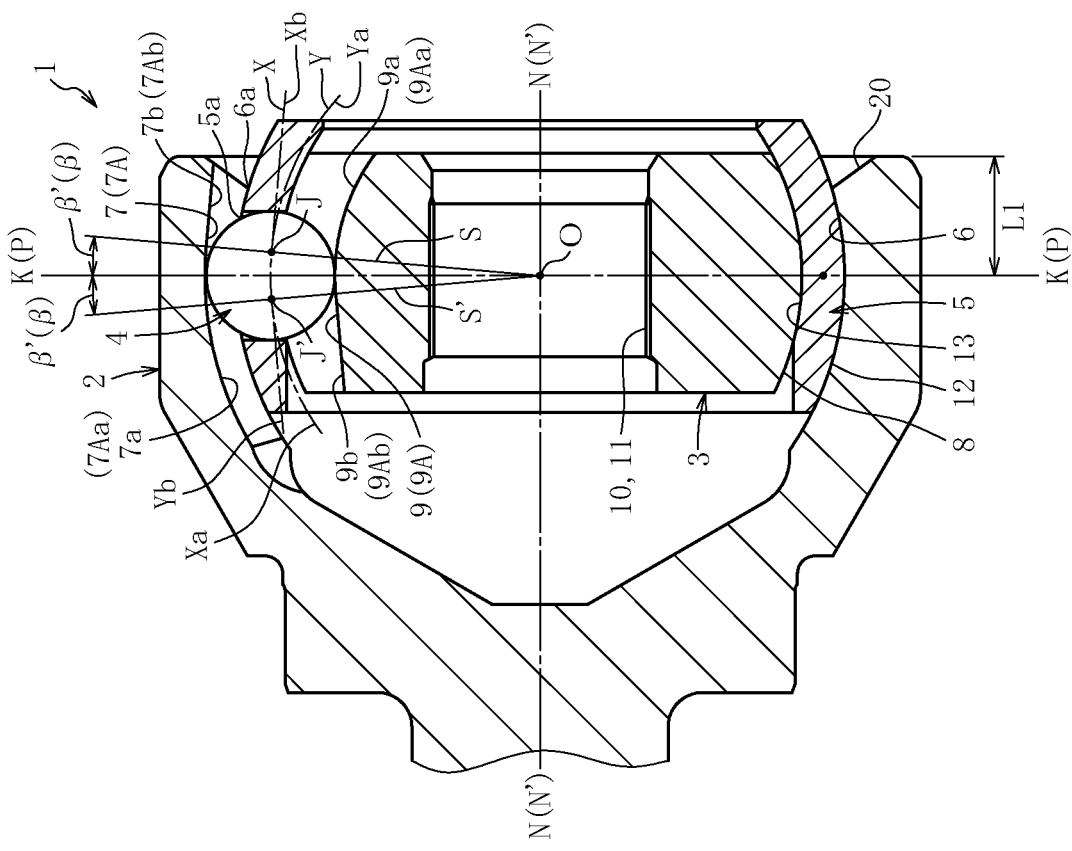
FIG. 1a is a longitudinal sectional view for illustrating a fixed type constant velocity universal joint according to one embodiment of the present invention.

A fixed type constant velocity universal joint according to one embodiment of the present invention is described with reference to FIG. 1 to FIG. 15. FIG. 1a is a longitudinal sectional view for illustrating the fixed type constant velocity universal joint according to one embodiment of the present invention. FIG. 1b is a right-side view of FIG. 1a.

Figure 2B:
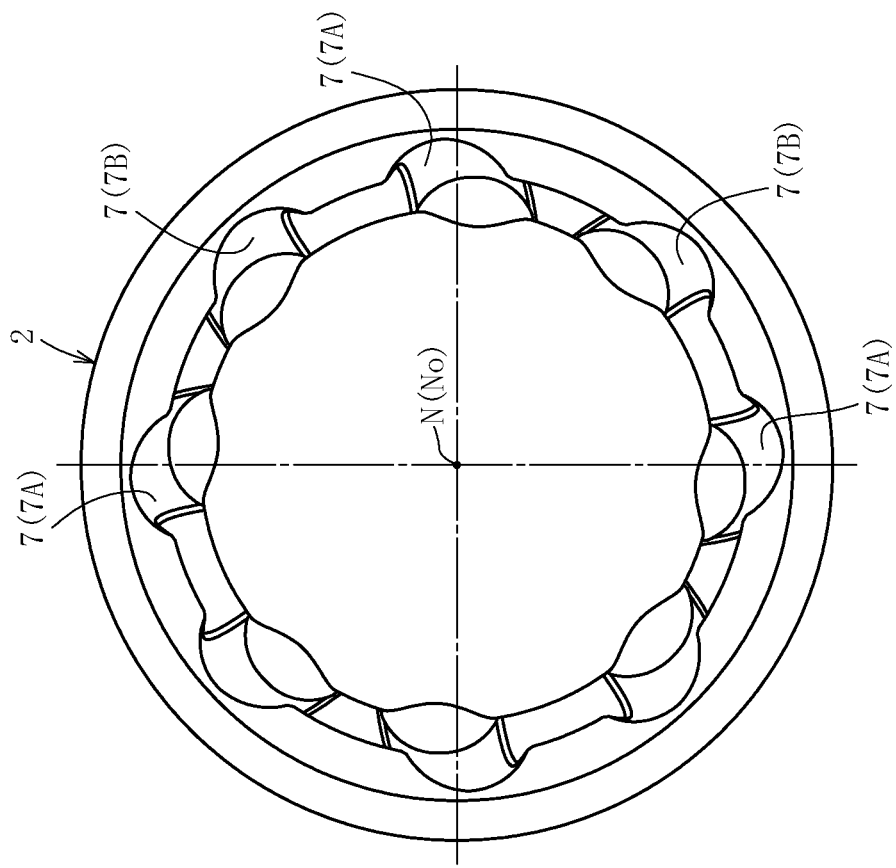
Figure 2A:
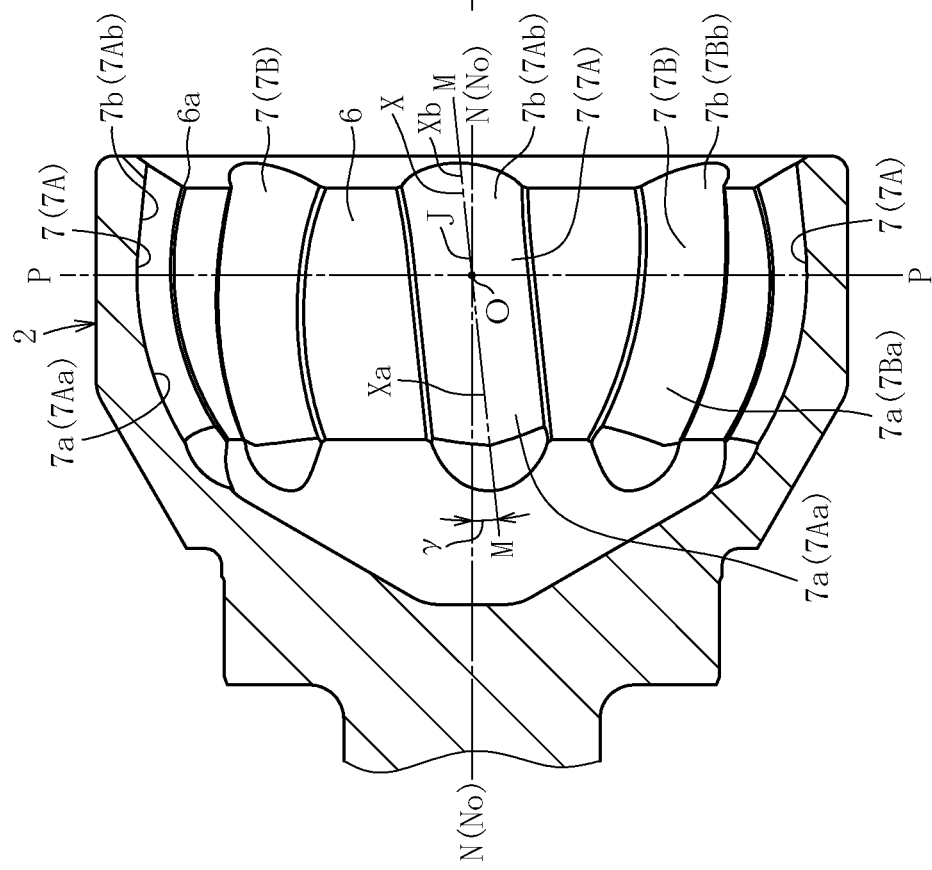
Figure 3A:
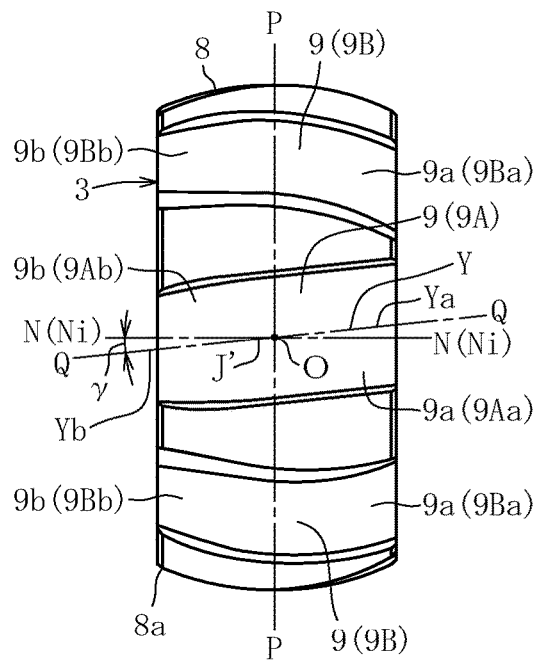
Figure 3B:
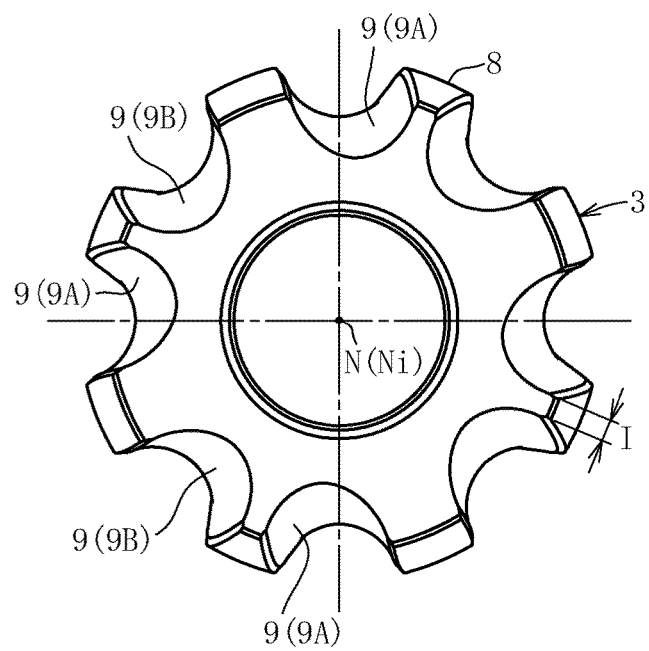

FIG. 2a is a longitudinal sectional view for illustrating the outer joint member of FIG. 1a. FIG. 2b is a right-side view of FIG. 2a. FIG. 3a is a front view for illustrating an inner joint member of FIG. 1a. FIG. 3b is a right-side view of FIG. 3a. As illustrated in FIG. 1a and FIG. 1b, a fixed type constant velocity universal joint 1 according to this embodiment is of a cross track groove type and mainly comprises an outer joint member 2, an inner joint member 3, toque transmission balls 4 (hereinafter simply referred to as "balls"), and a cage 5. A spherical inner peripheral surface 6 of the outer joint member 2 has eight track grooves 7. A spherical outer peripheral surface 8 of the inner joint member 3 has eight track grooves 9 opposed to the track grooves 7 of the outer joint member 2. The cage 5 configured to retain the balls 4 is arranged between the spherical inner peripheral surface 6 of the outer joint member 2 and the spherical outer peripheral surface 8 of the inner joint member 3. A spherical outer peripheral surface 12 of the cage 5 is fitted to the spherical inner peripheral surface 6 of the outer joint member 2 in a freely slidable manner, and a spherical inner peripheral surface 13 of the cage 5 is fitted to the spherical outer peripheral surface 8 of the inner joint member 3 in a freely slidable manner.

A curvature center of the spherical inner peripheral surface 6 of the outer joint member 2 and the curvature center of the spherical outer peripheral surface 8 of the inner joint member 3 are each formed at a joint center O. The curvature centers of the spherical outer peripheral surface 12 and the spherical inner peripheral surface 13 of the cage 5 which are fitted to the spherical inner peripheral surface 6 of the outer joint member 2 and the spherical outer peripheral surface 8 of the inner joint member 3, respectively, are also located at the joint center O.

A radially inner hole 10 of the inner joint member 3 has a female spline (the spline includes a serration, which similarly applies in the following description) 11, and a male spline 15 formed at an end portion of an intermediate shaft 14 (see FIG. 6a) is fitted to the female spline 11, thereby coupling the intermediate shaft 14 to the inner joint member 3 so as to enable transmission of torque. The inner joint member 3 and the intermediate shaft 14 are positioned in an axial direction by a stopper ring 16.

As illustrated in FIG. 1a, FIG. 1b, FIG. 2a, FIG. 2b, FIG. 3a, and FIG. 3b, the eight track grooves 7 and 9 of the outer joint member 2 and the inner joint member 3 extend substantially in the axial direction. With respect to an axis N-N of the joint, the track grooves 7 and 9 are formed with such inclination directions that track grooves 7A and 7B adjacent to each other in the circumferential direction are inclined in opposite directions and that the track grooves 9A and 9B adjacent to each other in the circumferential direction are inclined in opposite directions. The eight balls 4 are arranged at respective intersecting portions of paired track grooves 7A and 9A and paired track grooves 7B and 9B of the outer joint member 2 and the inner joint member 3. In FIG. 1a, illustration is given of the track grooves 7 and 9 in a state in which respective cross sections taken along the plane M illustrated in FIG. 2a and the plane Q illustrated in FIG. 3a are rotated to an inclination angle γ=0°. Under a state of taking an operating angle O, the axis N-N of the joint serves also as an axis No-No of the outer joint member and an axis Ni-Ni of the inner joint member.

With reference to FIG. 1a, the fixed type constant velocity universal joint according to this embodiment is described as an example of a configuration described in Claims in which "the raceway center line (X) of the track groove of the outer joint member comprises an arc-shaped portion having a curvature center that has no offset with respect to the joint center (O) in the axial direction, and a portion different in shape from the arc-shaped portion, in which the portion different in shape from the arc-shaped portion is smoothly connected to the arc-shaped portion at a connection point (J), and in which the connection point (J) is located more on the opening side of the outer joint member than the joint center (O)". The above-mentioned raceway center line X of the track groove of the outer joint member comprises the arc-shaped portion having the curvature center that has no offset with respect to the joint center O in the axial direction, and the portion different in shape from the arc-shaped portion. With this configuration, a constant velocity characteristic, transmission efficiency, and durability can be secured. In addition, a length of a track groove that is effective in keeping a contact, and a size of a wedge angle at the time of a large operating angle can be adjusted.

As illustrated in FIG. 1a, the track groove 7 of the outer joint member 2 has the raceway center line X. The track groove 7 is formed of a first track groove portion 7a and a second track groove portion 7b. The first track groove portion 7a has an arc-shaped raceway center line Xa having a curvature center at the joint center O. The second track groove portion 7b has a linear raceway center line Xb. The raceway center line Xb of the second track groove portion 7b is smoothly connected as a tangent to the raceway center line Xa of the first track groove portion 7a. The linear portion described above is the portion different in shape from the arc-shaped portion mentioned above. The raceway center line Xa of the first track groove portion 7a corresponds to "the arc-shaped portion having the curvature center that has no offset with respect to the joint center (O) in the axial direction", and the raceway center line X of the track groove of the outer joint member in Description and Claims comprises at least the above-mentioned arc-shaped portion.

In order to accurately indicate a mode and a shape of each track groove extending substantially in the axial direction, description is made with use of the term "raceway center line" in Description. Here, the raceway center line corresponds to a locus formed by a center of the ball when the ball arranged in the track groove moves along the track groove.

As illustrated in FIG. 1a, the track groove 9 of the inner joint member 3 has a raceway center line Y. The track groove 9 is formed of a first track groove portion 9a and a second track groove portion 9b. The first track groove portion 9a has an arc-shaped raceway center line Ya having a curvature center at the joint center O. The second track groove portion 9b has a linear raceway center line Yb. The raceway center line Yb of the second track groove portion 9b is smoothly connected as a tangent to the raceway center line Ya of the first track groove portion 9a. Respective curvature centers of the raceway center lines Xa and Ya of the first track groove portions 7a and 9a of the outer joint member 2 and the inner joint member 3 are arranged at the joint center O, that is, on the axis N-N of the joint. As a result, the depths of the track grooves can be uniformly set, and processing can easily be carried out.

With reference to FIG. 2a and FIG. 2b, a detailed description is made of the state in which the track grooves 7 of the outer joint member 2 are inclined in the circumferential direction with respect to the axis N-N of the joint. The track grooves 7 of the outer joint member 2 are denoted by reference symbols 7A and 7B based on the difference in the inclination directions. As illustrated in FIG. 2a, a plane M including the raceway center line X of the track groove 7A and the joint center O is inclined by the angle γ with respect to the axis N-N of the joint. Regarding each of the track grooves 7B adjacent to the track groove 7A in the circumferential direction, although illustration is omitted, the plane M including the raceway center line X of the track groove 7B and the joint center O is inclined by the angle γ with respect to the axis N-N of the joint in the direction opposite to the inclination direction of the track groove 7A.

In this embodiment, the entirety of the raceway center line X of the track groove 7A, that is, both of the raceway center line Xa of the first track groove portion 7a and the raceway center line Xb of the second track groove portion 7b are formed on the plane M.

Here, a supplementary description is made of reference symbols of the track grooves. The entire track groove of the outer joint member 2 is denoted by reference symbol 7. The first track groove portion of the track groove is denoted by reference symbol 7a, and the second track groove portion is denoted by reference symbol 7b. Further, track grooves having different inclination directions are denoted by reference symbols 7A and 7B for distinction. Respective first track groove portions are denoted by reference symbols 7Aa and 7Ba, and respective second track groove portions are denoted by reference symbols 7Ab and 7Bb. The track grooves of the inner joint member 3 to be described later are denoted by reference symbols in a similar manner.

Next, with reference to FIG. 3a and FIG. 3b, a detailed description is made of the state in which the track grooves 9 of the inner joint member 3 are inclined in the circumferential direction with respect to the axis N-N of the joint. The track grooves 9 of the inner joint member 3 are denoted by reference symbols 9A and 9B based on the difference in the inclination directions. As illustrated in FIG. 3a, a plane Q including the raceway center line Y of the track groove 9A and the joint center O is inclined by the angle γ with respect to the axis N-N of the joint. Regarding each of the track grooves 9B adjacent to the track groove 9A in the circumferential direction, although illustration is omitted, the plane Q including the raceway center line Y of the track groove 9B and the joint center O is inclined by the angle γ with respect to the axis N-N of the joint in the direction opposite to the inclination direction of the track groove 9A. It is preferred that the inclination angle γ be set within the range of from 4° to 12° in consideration of the operability of the fixed type constant velocity universal joint 1 and a spherical surface width I on the side on which the track grooves of the inner joint member 3 are closest to each other.

Moreover, similarly to the outer joint member 2 mentioned above, in this embodiment, the entirety of the raceway center line Y of the track groove 9A, that is, both of the raceway center line Ya of the first track groove portion 9a and the raceway center line Yb of the second track groove portion 9b are formed on the plane Q. The raceway center line Y of the track groove 9 of the inner joint member 3 is formed so as to be mirror-symmetric with the raceway center line X of the paired track groove 7 of the outer joint member 2 with the plane P including the joint center O and being orthogonal to the axis N-N of the joint in the state of the operating angle of 0° as a reference.

With reference to FIG. 1a, a detailed description is made of the track grooves of the outer joint member 2 and the inner joint member 3 as seen on the longitudinal cross section. In FIG. 1a, as mentioned above, illustration is given of the track grooves 7 and 9 in the state in which respective cross sections as seen on the plane M illustrated in FIG. 2a and the plane Q illustrated in FIG. 3a are rotated to the inclination angle γ=0°. That is, with regard to the outer joint member 2, FIG. 2a is a sectional view taken along the plane M of FIG. 2a including the raceway center line X of the track groove 7A of the outer joint member 2 and the joint center O. Thus, in a strict sense, FIG. 1a is not a longitudinal sectional view taken along the plane including the axis N-N of the joint and is an illustration of the cross section inclined by the angle γ. In FIG. 1a, the track groove 7A of the outer joint member 2 is illustrated. The track groove 7B has the inclination direction opposite to that of the track groove 7A, and other configurations of the track groove 7B are the same as those of the track groove 7A. Therefore, description of the track groove 7B is omitted. The spherical inner peripheral surface 6 of the outer joint member 2 has the track grooves 7A extending substantially along the axial direction.

The track groove 7A has the raceway center line X. The track groove 7A is formed of the first track groove portion 7Aa and the second track groove portion 7Ab. The first track groove portion 7Aa has the arc-shaped raceway center line Xa having a curvature center at the joint center O (no offset in the axial direction). The second track groove portion 7Ab has the linear raceway center line Xb. At an end portion J of the raceway center line Xa of the first track groove portion 7Aa on the opening side, the linear raceway center line Xb of the second track groove portion 7Ab is smoothly connected as a tangent. That is, the end portion J serves as a connection point between the first track groove portion 7Aa and the second track groove portion 7Ab. The end portion J is located more on the opening side than the joint center O. Therefore, the linear raceway center line Xb of the second track groove portion 7Ab connected as a tangent at the end portion J of the raceway center line Xa of the first track groove portion 7Aa on the opening side is formed in such a manner as to approach the axis N-N of the joint as approaching the opening side. With this configuration, the length of the track that is effective can be increased, and the wedge angle can be prevented from being excessively large.

As illustrated in FIG. 1a, a straight line connecting the end portion J and the joint center O to each other is denoted by reference symbol S. An axis N'-N' of the joint projected on the plane M including the raceway center line X of the track groove 7A and the joint center O is inclined by the angle γ with respect to the axis N-N of the joint, and an angle formed between a perpendicular line K, which is perpendicular to the axis N'-N' at the joint center O, and the straight line S is denoted by reference symbol ß'. The perpendicular line K described above is located on the plane P including the joint center O and being orthogonal to the axis N-N of the joint in the state of the operating angle of 0°. Thus, an angle ß formed by the straight line S with respect to the plane P in the present invention has a relationship of sin ß=sin ß'×cos γ.

Similarly, with reference to FIG. 1a, a detailed description is made of the track grooves of the inner joint member 3 as seen on the longitudinal cross section. FIG. 1a is a sectional view taken along the plane Q of FIG. 3a including the raceway center line Y of the track groove 9A of the inner joint member 3 and the joint center O. Thus, in a strict sense, FIG. 1a is not a longitudinal sectional view taken along the plane including the axis N-N of the joint and is an illustration of the cross section inclined by the angle γ. In FIG. 1a, the track groove 9A of the inner joint member 3 is illustrated. The track groove 9B has the inclination direction opposite to that of the track groove 9A, and other configurations of the track groove 9B are the same as those of the track groove 9A. Therefore, description of the track groove 9B is omitted. The spherical outer peripheral surface 8 of the inner joint member 3 has the track grooves 9A extending substantially along the axial direction.

The track groove 9A has the raceway center line Y. The track groove 9A is formed of a first track groove portion 9Aa and a second track groove portion 9Ab. The first track groove portion 9Aa has the arc-shaped raceway center line Ya having a curvature center at the joint center O (no offset in the axial direction). The second track groove portion 9Ab has the linear raceway center line Yb. At an end portion J' of the raceway center line Ya of the first track groove portion 9Aa on the back side, the raceway center line Yb of the second track groove portion 9Ab is smoothly connected as a tangent. That is, the end portion J' serves as a connection point between the first track groove portion 9Aa and the second track groove portion 9Ab. The end portion J' is located more on the back side than the joint center O. Therefore, the linear raceway center line Yb of the second track groove portion 9Ab connected as a tangent at the end portion J' of the raceway center line Ya of the first track groove portion 9Aa on the back side is formed in such a manner as to approach the axis N-N of the joint as approaching the back side. With this configuration, the length of the track that is effective can be increased, and the wedge angle can be prevented from being excessively large.

As illustrated in FIG. 1a, a straight line connecting the end portion J' and the joint center O to each other is denoted by reference symbol S'. The axis N'-N' of the joint projected on the plane Q including the raceway center line Y of the track groove 9A and the joint center O is inclined by the angle γ with respect to the axis N-N of the joint, and an angle formed between the perpendicular line K, which is perpendicular to the axis N'-N' at the joint center O, and the straight line S' is denoted by reference symbol ß'. The perpendicular line K described above is located on the plane P including the joint center O and being orthogonal to the axis N-N of the joint in the state of the operating angle of 0°. Thus, an angle ß formed by the straight line S' with respect to the plane P including the joint center O in the state of the operating angle of 0° has a relationship of sin ß=sin ß'×cos γ.

Next, description is made of the angle ß formed by each of the straight lines S and S' with respect to the plane P including the joint center O in the state of the operation angle of 0° and being orthogonal to the axis N-N of the joint. When the operating angle θ is taken, the ball 4 moves by θ/2 with respect to the plane P including the joint center O of the outer joint member 2 and the inner joint member 3. The angle ß is determined based on ½ of the operating angle that is frequently used, and the range of the track groove with which the ball 4 comes into contact is determined within the range of the operating angle that is frequently used. Here, a definition of the normal operating angle that is frequently used is given. A normal operating angle of a joint is an operating angle that is formed in a fixed type constant velocity universal joint for a front drive shaft when an automobile with one passenger is steered to go straight on a horizontal and flat road. In general, the normal operating angle is selected and determined within the range of from 2° to 15° depending on design conditions for various types of automobiles.

With the angle ß described above, in FIG. 1a, the end portion J of the raceway center line Xa of the first track groove portion 7Aa corresponds to a center position of the ball that moves most toward the opening side along the axial direction at the time of the normal operating angle. Similarly, in the inner joint member 3, the end portion J' of the raceway center line Ya of the first track groove portion 9Aa corresponds to a center position of the ball that moves most toward the back side along the axial direction at the time of the normal operating angle. With such settings, within the range of the normal operating angle, the balls 4 are located at the first track groove portions 7Aa and 9Aa and the first track groove portions 7Ba and 9Ba, which have the opposite inclination direction, of the outer joint member 2 and the inner joint member 3. Therefore, forces acting in opposite directions are applied by the balls 4 to the pockets 5a of the cage 5 adjacent to each other in the circumferential direction, thereby stabilizing the cage 5 at the position of the joint center O (see FIG. 1a). Therefore, a contact force between the spherical outer peripheral surface 12 of the cage 5 and the spherical inner peripheral surface 6 of the outer joint member 2 and a contact force between the spherical inner peripheral surface 13 of the cage 5 and the spherical outer peripheral surface 8 of the inner joint member 3 are suppressed, and torque loss and generation of heat are suppressed, thereby improving the durability.

In the range of the large operating angle, the balls 4 arranged in the circumferential direction are temporarily and separately located at the first track groove portions 7Aa and 9Aa and the second track groove portions 7Ab and 9Ab. As a result, the contact forces are generated at the spherical-surface contact portions 12 and 6 between the cage 5 and the outer joint member 2 and at the spherical-surface contact portions 13 and 8 between the cage 5 and the inner joint member 3. However, as compared to a related-art axial track offset type, a moment and the forces applied to the cage 5 by the balls 4 are balanced, and hence the cage 5 is stable near a bisecting plane. Further, the range of the large operating angle is not frequently used, and the fixed type constant velocity universal joint 1 according to this embodiment is thus capable of suppressing the torque loss and generation of heat as a whole. Accordingly, a fixed type constant velocity universal joint which is small in torque loss and generation of heat and is highly efficient can be achieved.

Figure 4:
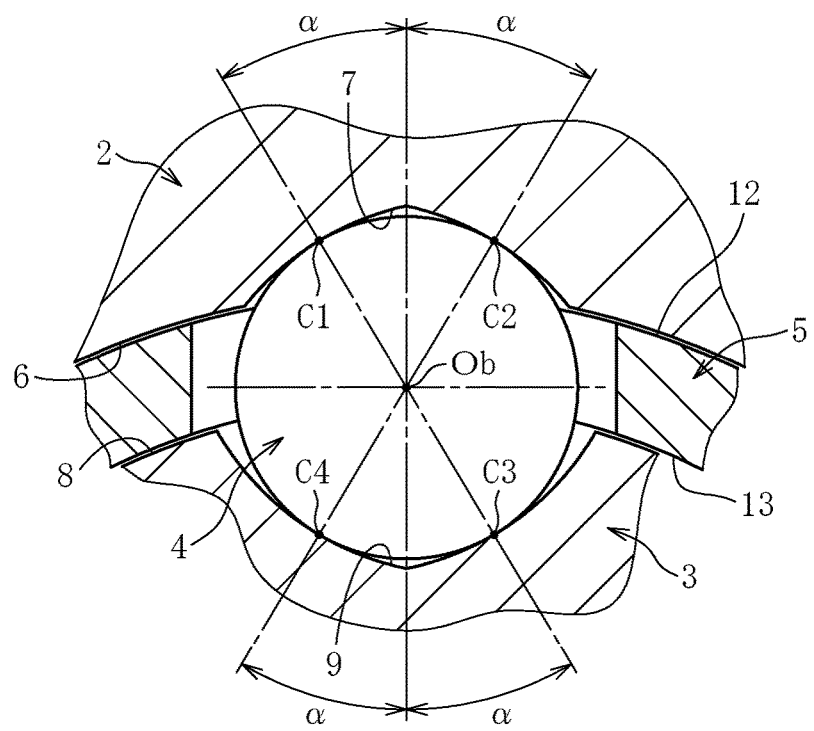

FIG. 4 is an enlarged transverse sectional view for illustrating one ball and track grooves taken along the line P-P of FIG. 1a. In FIG. 4, illustration is given of the track grooves 7 and 9 in a state in which respective cross sections taken along the plane M illustrated in FIG. 2a and the plane Q illustrated in FIG. 3a are rotated to an inclination angle γ=0°. A transverse sectional shape of each of the track grooves 7 of the outer joint member 2 and the track grooves 9 of the inner joint member 3 is an elliptical shape or a gothic-arch shape. As illustrated in FIG. 4, the ball 4 is brought into angular contact with the track groove 7 of the outer joint member 2 at two points C1 and C2 and is brought into angular contact with the track groove 9 of the inner joint member 3 at two points C3 and C4. It is preferred that an angle (contact angle α) formed between a straight line passing through a center Ob of the ball 4 and each of the contacts C1, C2, C3 and C4 and a straight line passing through the center Ob of the ball 4 and the joint center O (see FIG. 1a) be set to be equal to or larger than 30°. The transverse sectional shape of each of the track grooves 7 and 9 may be an arc shape, and the track grooves 7 and 9 and the balls 4 may be brought into circular contact with each other.

The overall configuration of the fixed type constant velocity universal joint 1 according to this embodiment is as described above. The fixed type constant velocity universal joint 1 according to this embodiment is set to have a maximum operating angle that significantly exceeds 50°. The characteristic configurations are as described below.

(1) In a fixed type constant velocity universal joint of a cross track groove type, there is achieved an operation mode in which the ball loses a contact when the maximum operating angle is taken.

(2) In addition, when a large operating angle is taken, an operating angle θ2 at which the ball 4 loses a contact with the track groove 9 of the inner joint member 3 is set to be larger than an operating angle θ1 at which the ball 4 loses a contact with the track groove 7 of the outer joint member 2.

With the configurations described above, the fixed type constant velocity universal joint of the cross track groove type has the operation mode in which, when the maximum operating angle is taken, the ball loses a contact. Thus, even at the large operating angle at which the ball 4 loses a contact with the track groove 7 of the outer joint member 2, the moment and the forces applied to the cage 5 by the balls 4 act so as to be balanced, and hence the cage 5 is not significantly displaced from the bisecting plane. The characteristic configuration (2) described above is combined with the advantageous characteristic configuration (1) that is basically provided to the fixed type constant velocity universal joint of the cross track groove type and is capable of minimizing reduction in constant velocity characteristic and transmission efficiency, and minimizing changes of internal forces. Through the combination of the configurations, the fixed type constant velocity universal joint, which has the maximum operating angle set to be larger than the hitherto-adopted operating angle (50°) and has the operation mode in which the ball loses a contact, can be dramatically improved in constant velocity characteristic, transmission efficiency, changes of internal forces, strength, and durability.

Figure 5:
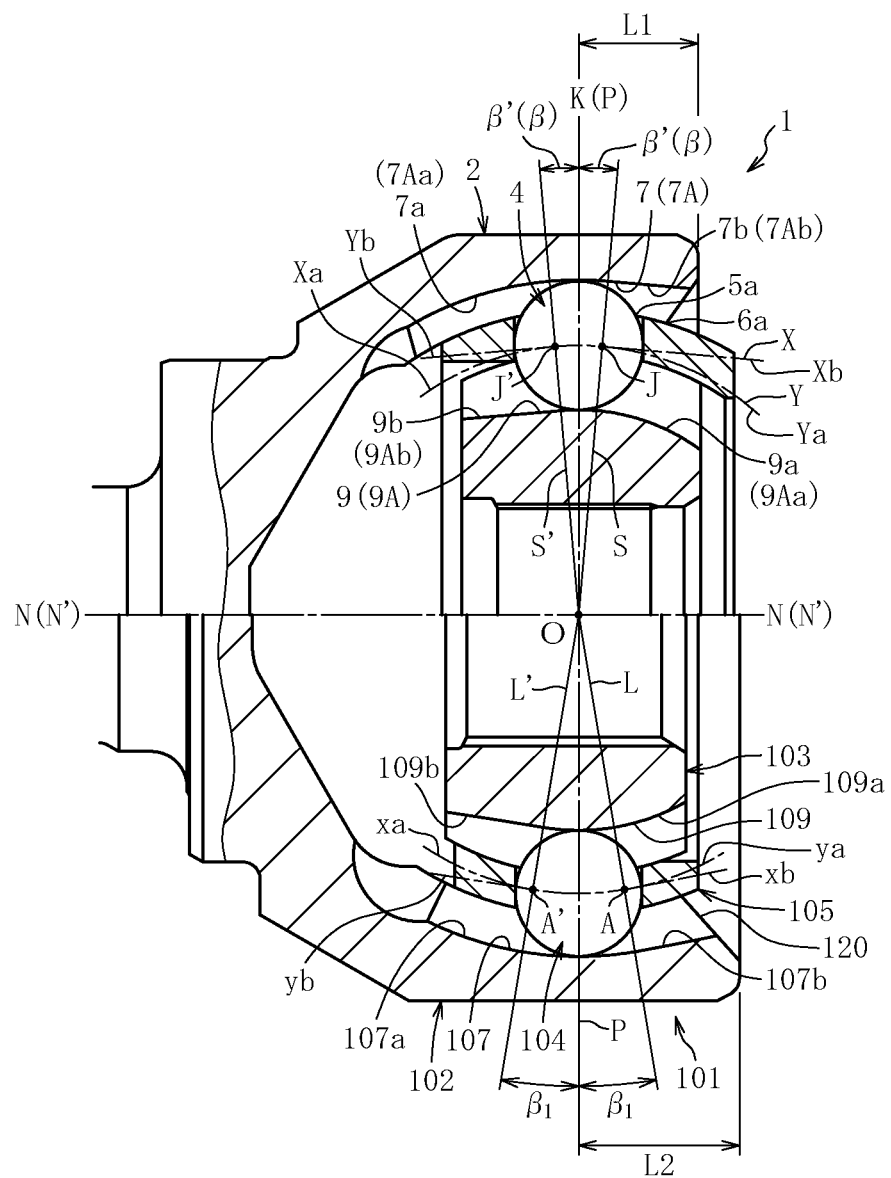
FIG. 5 is a view for illustrating comparison between a longitudinal cross section of the fixed type constant velocity universal joint of FIG. 1a and a longitudinal cross section of a fixed type constant velocity universal joint of a cross track groove type having the hitherto-adopted maximum operating angle.

First, the characteristic configuration (1) of the fixed type constant velocity universal joint 1 according to this embodiment is described with reference to FIG. 5. An upper half of FIG. 5 with respect to a center line (axis of the joint) is a longitudinal sectional view for illustrating the fixed type constant velocity universal joint 1 according to this embodiment, and a lower half of FIG. 5 is a longitudinal sectional view for illustrating the fixed type constant velocity universal joint of the cross track groove type having the hitherto-adopted maximum operating angle and comprising eight balls. A fixed type constant velocity universal joint 101 of the cross track groove type illustrated in the lower half of FIG. 5 has the hitherto-adopted maximum operating angle, that is, has the maximum operating angle of 47°. The fixed type constant velocity universal joint 101 mainly comprises an outer joint member 102, an inner joint member 103, balls 104, and a cage 105. Track grooves 107 of the outer joint member 102 and track grooves 109 of the inner joint member 103 of the fixed type constant velocity universal joint 101 are the same as the track grooves 7 and 9 in this embodiment, and hence only outlines thereof are described.

The track grooves 107 of the outer joint member 102 of the fixed type constant velocity universal joint 101 are each formed of a first track groove portion 107a and a second track groove portion 107b, and the track grooves 109 of the inner joint member 103 of the fixed type constant velocity universal joint 101 are each formed of a first track groove portion 109a and a second track groove portion 109b. The first track groove portions 107a and 109a respectively have arc-shaped raceway center lines xa and ya each having a curvature center at the joint center O (no offset in the axial direction), and the second track groove portions 107b and 109b respectively have linear raceway center lines xb and yb. The raceway center line xa of the first track groove portion 107a and the raceway center line xb of the second track groove portion 107b of the outer joint member 102 are tangentially and smoothly connected to each other at a connection point A that is more on the opening side than the joint center O. The raceway center line ya of the first track groove portion 109a and the raceway center line yb of the second track groove portion 109b of the inner joint member 103 are tangentially and smoothly connected to each other at a connection point A' on a back side.

Similarly to the fixed type constant velocity universal joint 1 according to this embodiment, the track grooves 107 of the outer joint member 102 and the track grooves 109 of the inner joint member 103 are inclined in the circumferential direction with respect to the axis N-N of the joint, and are formed with such inclination directions that the track grooves 107 adjacent to each other in the circumferential direction are inclined in opposite directions and that the track grooves 109 adjacent to each other in the circumferential direction are inclined in opposite directions. A straight line L or L' connecting the connection point A or A' and the joint center O to each other forms an angle $\text{ß}_1$ with respect to the plane P including the joint center O and being orthogonal to the axis N-N of the joint. The angle $\text{ß}_1$ is set to be larger than the angle ß of the fixed type constant velocity universal joint 1 according to this embodiment.

The fixed type constant velocity universal joint 101 has an operation mode in which the balls 104 are always kept in a contact state with respect to the track grooves 107 of the outer joint member 102 up to the maximum operating angle (47°). An inlet chamfer 120 formed at an opening-side end portion of the outer joint member 102 is set such that, at the maximum operating angle, an intermediate shaft does not interfere with the inlet chamfer 120 and that a contact state between the balls 104 and the track grooves 107 of the outer joint member 102 is kept. Accordingly, an axial dimension L2 from the joint center O to an opening-side end surface of the outer joint member 102 is set to be relatively long.

When a large operating angle with the maximum operating angle larger than 47° is required, the intermediate shaft interferes with the inlet chamfer 120. In order to avoid the interference, the inlet chamfer 120 is moved in the axial direction toward the joint center O, and an inclination angle is suitably increased. However, along with this, it is required that the axial dimension from the joint center O to the opening-side end surface of the outer joint member 102 be reduced. The fixed type constant velocity universal joint 1 according to this embodiment meets this requirement, and the maximum operating angle of the fixed type constant velocity universal joint 1 is set to be significantly larger than the hitherto-adopted maximum operating angle. In the fixed type constant velocity universal joint 1 according to this embodiment illustrated in the upper half of FIG. 5, an axial dimension L1 from the joint center O to an opening-side end surface of the outer joint member 2 is smaller than the axial dimension L2 from the joint center O to an opening-side end surface of the outer joint member 102 of the fixed type constant velocity universal joint 101 having the hitherto-adopted maximum operating angle, which is illustrated in the lower half of FIG. 5.

Figure 6A:
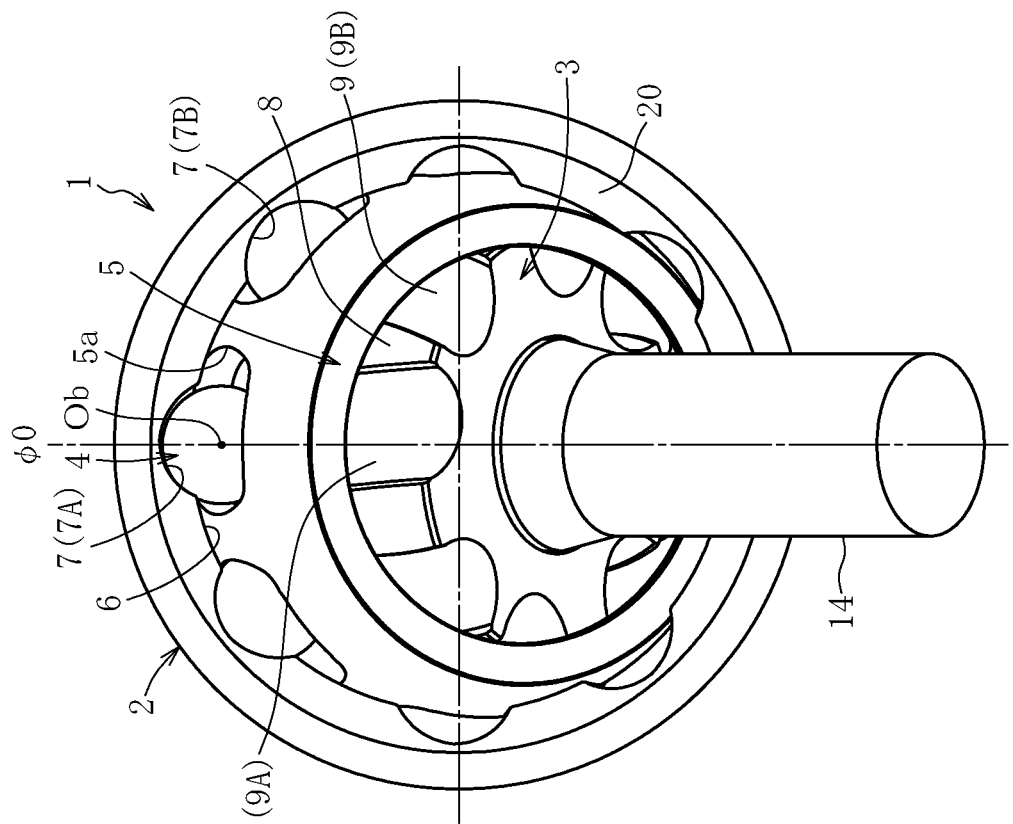
FIG. 6a is a longitudinal sectional view for illustrating the fixed type constant velocity universal joint of FIG. 1a and FIG. 1b when the fixed type constant velocity universal joint takes the maximum operating angle.
Figure 6B:
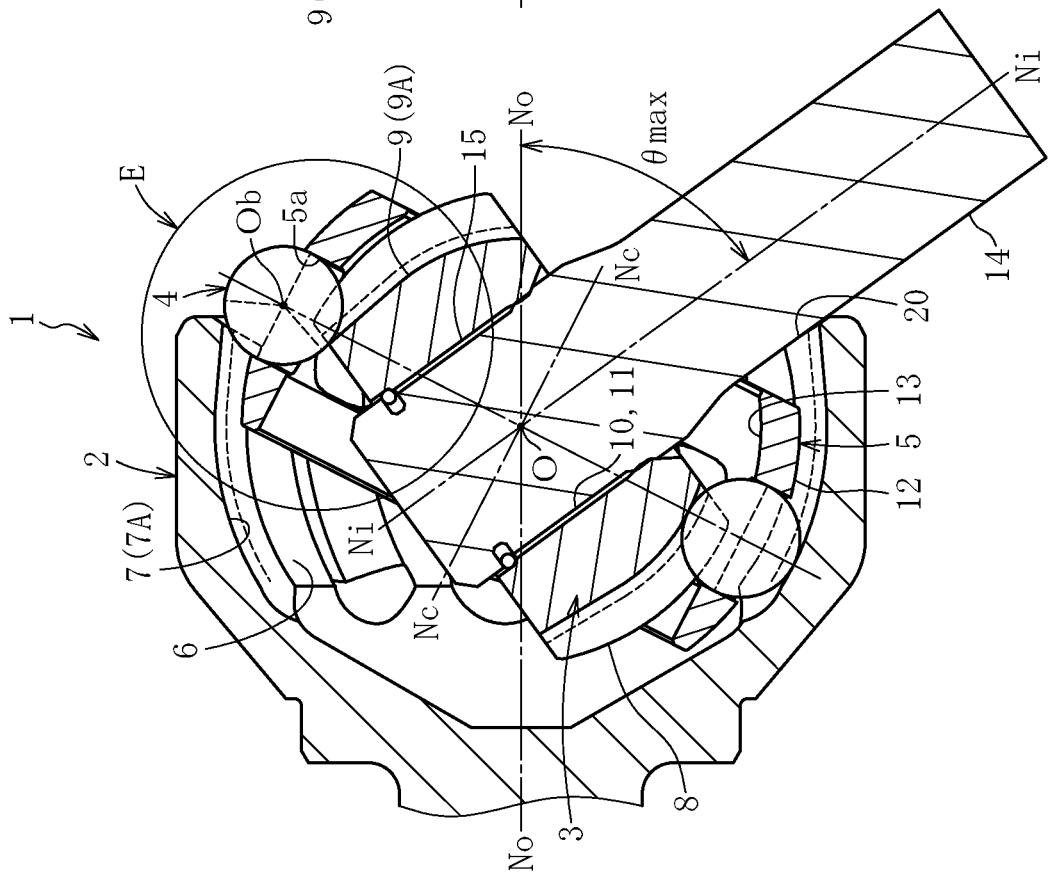
Figure 7:
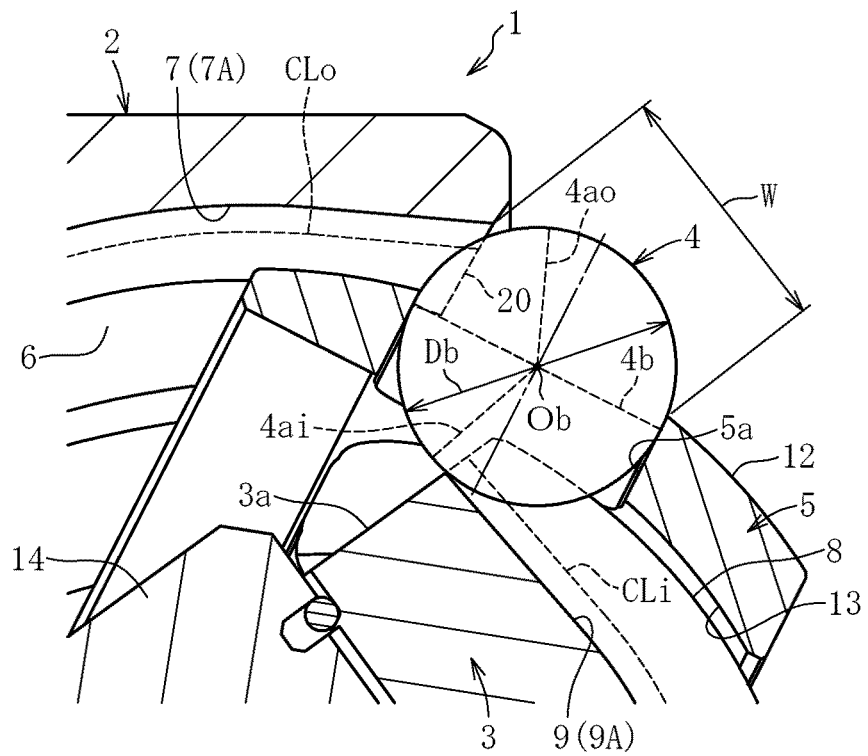

With reference to FIG. 6a and FIG. 6b, description is made of a state in which the fixed type constant velocity universal joint 1 according to this embodiment takes the maximum operating angle. FIG. 6a is a longitudinal sectional view for illustrating the fixed type constant velocity universal joint 1 when the fixed type constant velocity universal joint 1 takes the maximum operating angle. FIG. 6b is a right-side view of FIG. 6a. As described above, a length of each of the track grooves 7 on the opening side of the outer joint member 2 is reduced. Accordingly, in the operation mode of the fixed type constant velocity universal joint 1 according to this embodiment, as illustrated in FIG. 6a, when a maximum operating angle θmax significantly larger than the hitherto-adopted maximum operating angle is taken, the ball 4 comes off an opening-side end portion of the track groove 7 of the outer joint member 2 and loses a contact with the track groove 7. Further, the ball 4 comes off a back-side end portion of the track groove 9 of the inner joint member 3 and loses a contact with the track groove 9. As illustrated in FIG. 6b, when the maximum operating angle θmax is taken, the center Ob of the ball 4 is most distant from the opening-side end portion of the track groove 7 of the outer joint member 2 at a position of a phase angle φ0.

FIG. 6a is an illustration of a state in which the axis Ni-Ni of the inner joint member 3 (intermediate shaft 14) is bent with respect to the axis No-No of the outer joint member 2 to the maximum operating angle θmax (for example, 55°) on the drawing sheet of FIG. 6a. An axis Nc-Nc of the cage 5 is inclined at a bisecting angle θmax/2. As illustrated in FIG. 6b, an illustration of the center Ob of the uppermost ball 4 is slightly displaced in the circumferential direction from the phase angle of 0° due to a relationship with the inclination angle γ of the track groove 7 of the outer joint member 2. Here, the phase angle of 0° refers to an angular position of the center Ob of the uppermost (top) ball 4 in the circumferential direction under a state in which the operating angle is 0° as illustrated in FIG. 1b. In Description and Claims, the phase angle is indicated as proceeding in a counterclockwise direction from the phase angle of 0° (the phase angle of 0° is indicated by "φ0" in FIG. 6b, and hereinafter also referred to as "φ0"). Further, in Description and Claims, the term "maximum operating angle θmax" is used with the meaning of a maximum operating angle that is allowed when the fixed type constant velocity universal joint 1 is used.

FIG. 6a is an illustration of a state in which the intermediate shaft 14 is in abutment against the inlet chamfer 20 at the time of the maximum operating angle. However, in actuality, the inlet chamfer 20 is set so as to have such a shape and a dimension that a slight margin is given with respect to a radially outer surface of the intermediate shaft 14 when the maximum operating angle is taken. The inlet chamfer 20 functions as a stopper surface for a case in which the intermediate shaft 14 exceeds the maximum operating angle.

As illustrated in FIG. 6a, in the fixed type constant velocity universal joint 1 according to this embodiment, when the maximum operating angle is taken, the ball 4, which is located around the phase angle φ0 and moves toward the opening side of the track groove 7 of the outer joint member 2, comes off the opening-side end portion of the track groove 7 of the outer joint member 2 (inlet chamfer 20) and loses a contact with the track groove 7. Further, the ball 4 comes off the back-side end portion of the track groove 9 of the inner joint member 3 and loses a contact with the track groove 9. This state is described in detail with reference to FIG. 7 for illustrating the portion E of FIG. 6a in an enlarged manner.

A surface position 4ao of the ball 4 when the ball 4 comes into contact with the track groove 7 and the inlet chamfer 20 formed at the opening-side end portion of the outer joint member 2, a surface position 4ai of the ball 4 when the ball 4 comes into contact with the track groove 9, and a surface position 4b of the ball 4 when the ball 4 comes into contact with the pocket 5a of the cage 5 are each indicated by a broken line. Further, a contact locus obtained by connecting the contacts C2 (or C1, see FIG. 4), which are given between the track groove 7 of the outer joint member 2 and the ball 4, in the axial direction is denoted by CLo, and a contact locus obtained by connecting the contacts C3 (or C4, see FIG. 4), which are given between the track groove 9 of the inner joint member 3 and the ball 4, in the axial direction is denoted by CLi. The contact locus CLo and the contact locus CLi are each indicated by a broken line. The contact loci CLo and CLi are formed at positions apart from the groove bottoms of the track grooves 7 and 9, respectively.

The contact locus CLo ends at an edge portion of the inlet chamfer 20 on the opening side of the outer joint member 2. The edge portion of the inlet chamfer 20 is the opening-side end portion of the track groove 7 of the outer joint member 2. The surface position 4ao of the ball 4 is on a right side in FIG. 7 with respect to the end of the contact locus CLo, and the ball 4 and the track groove 7 are in a non-contact state. The ball 4 that loses a contact with the track groove 7 is one or two of the eight balls, and the one or two balls 4 are not involved in torque transmission. The contact locus CLi of the track groove 9 of the inner joint member 3 ends at the back-side end portion 3a. The surface position 4ai of the ball 4 is on a left side in FIG. 7 with respect to the end of the contact locus CLi, and the ball 4 and the track groove 9 are in a non-contact state. An interval between the surface position 4ao of the ball 4 and the end of the contact locus CLo on the track groove 7 of the outer joint member 2 is set to be larger than an interval between the surface position 4ai of the ball 4 and the end of the contact locus CLi on the track groove 9 of the inner joint member 3.

A contact state between the surface position 4b of the ball 4 and the pocket 5a of the cage 5 is kept at a radial position before the spherical outer peripheral surface 12 of the cage 5. The pocket 5a and the ball 4 are fitted to each other with an extremely slight interference margin, and the ball 4 and the track groove 9 of the inner joint member 3 are in a non-contact state. Thus, no inevitable interference occurs between the track groove 9 and the ball 4. As a result, the ball 4 is reliably retained in the pocket 5a, and for example, generation of noise is prevented. Even when the ball 4 comes off the pocket 5a, a distance W between the edge portion of the inlet chamfer 20 of the track groove 7 and an edge portion of the pocket 5a of the cage 5 is set so as to satisfy a relationship of db>W with a diameter Db of the ball 4, and hence the ball 4 is prevented from being dropped off.

Figure 8:
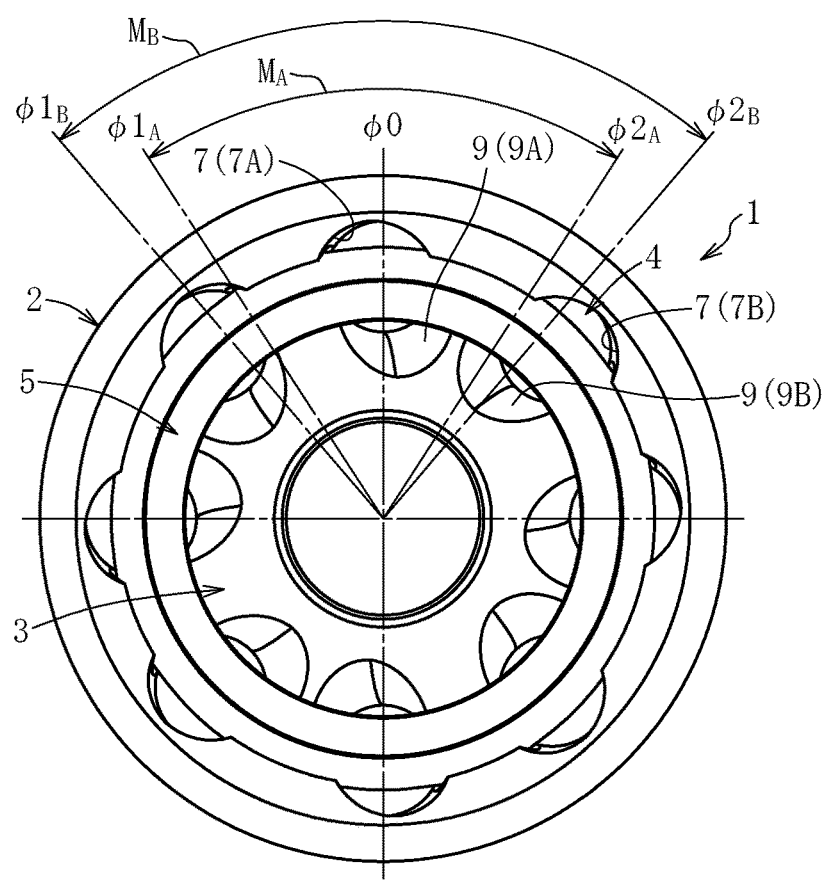
FIG. 8 is an illustration in which a range in which the torque transmission ball loses a contact with the track groove of the outer joint member at the maximum operating angle is illustrated on FIG. 1b.

Next, a range in which the ball 4 comes off the track groove 7, that is, a phase angle range (hereinafter, also simply referred to as "range") in which the ball 4 and the track groove 7 are brought into a non-contact state is described with reference to FIG. 8. FIG. 8 is an illustration in which the range in which the ball 4 comes off the track groove 7 of the outer joint member 2 at the maximum operating angle is illustrated on FIG. 1b. In FIG. 8, the range in which the ball 4 comes off the track groove 7 of the outer joint member 2 is indicated by the arrows. The leader line of each arrow indicates the center Ob of the ball 4. In the fixed type constant velocity universal joint 1 according to this embodiment, the track grooves 7A and 7B of the outer joint member 2 each have the inclination angle γ with respect to the axis N-N of the joint in the circumferential direction, and the track grooves 7A and 7B are formed with such inclination directions that the track grooves 7A and 7B adjacent to each other in the circumferential direction are inclined in opposite directions. Accordingly, as illustrated in FIG. 8, a phase angle range $M_A$ in which the ball 4 comes off the track groove 7A is slightly different from a phase angle range $M_B$ in which the ball 4 comes off the track groove 7B.

A detailed description is made of the range in which the ball 4 comes off the track groove 7 using one ball 4 located in the track groove 7A in FIG. 6a, FIG. 6b, and FIG. 8 as an example. Under a state in which the axis No-No of the outer joint member 2 and the axis Ni-Ni of the inner joint member 3 (intermediate shaft 14) illustrated in FIG. 6a are fixed, when the fixed type constant velocity universal joint 1 is rotated in the counterclockwise direction from the phase angle φ0, at a position of a phase angle $\varphi 2_A$ (for example, $\varphi 2_A = 336°$) before the phase angle φ0 in FIG. 8, the ball 4 comes off the opening-side end portion of the track groove 7A of the outer joint member 2, and loses a contact with the track groove 7A to start a non-contact state with respect to the track groove 7A. When the fixed type constant velocity universal joint 1 is rotated beyond the phase angle φ0, at a position of a phase angle $\varphi 1_A$ (for example, $\varphi 1_A = 24°$) the ball 4 returns to the opening-side end portion of the track groove 7A of the outer joint member 2 to start a contact state with respect to the track groove 7A.

In the description above, one ball 4 is described as an example. However, in actuality, when the fixed type constant velocity universal joint 1 is rotated, the eight balls 4 sequentially pass through the phase angle range in which the balls 4 are brought into the non-contact state. The ball 4 located in the track groove 7B also has the same operation as that of the ball 4 located in the track groove 7A. However, the track groove 7B is formed so as to have the inclination direction opposite to the inclination direction of the track groove 7A. Accordingly, at a phase angle $\varphi 2_B$ (for example, $\varphi 2_B = 333°$), the ball 4 comes off the opening-side end portion of the track groove 7B of the outer joint member 2, and loses a contact with the track groove 7B to start a non-contact state with respect to the track groove 7B. Further, at a phase angle $\varphi 1_B$ (for example, $\varphi 1_B = 27°$), the ball 4 returns to the opening-side end portion of the track groove 7B of the outer joint member 2 to start a contact state with respect to the track groove 7B. Accordingly, as illustrated in FIG. 8, the range $M_A$ in which the ball 4 comes off the track groove 7A is slightly different from the range $M_B$ in which the ball 4 comes off the track groove 7B.

Figure 9:
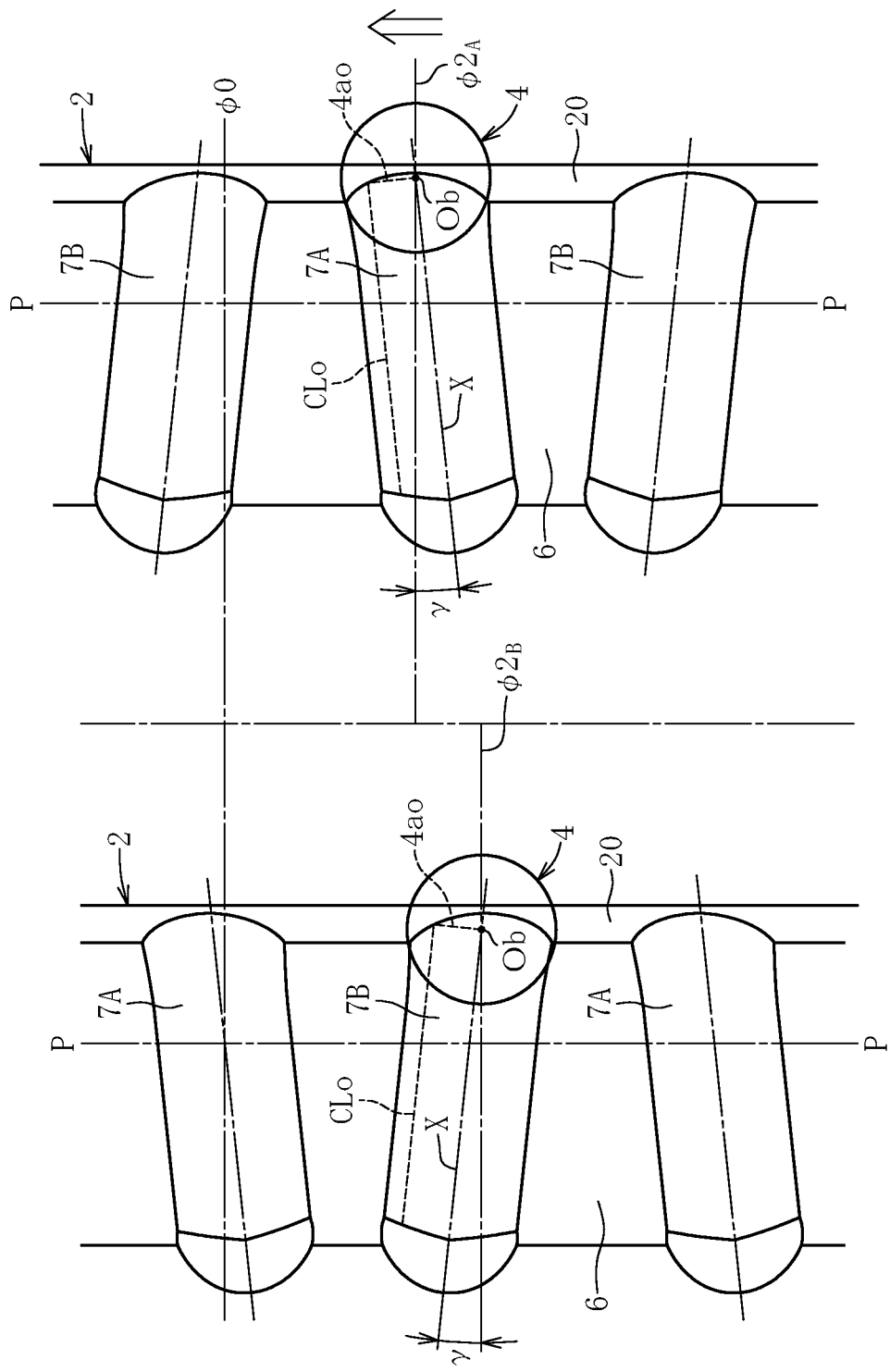
FIG. 9 is a development view of an inner peripheral surface of the outer joint member, for illustrating a difference given by inclination directions of the track grooves between ranges in which the torque transmission balls lose contacts with the track grooves of the outer joint member of FIG. 8.

Moreover, the reason is described with reference to FIG. 9. FIG. 9 is a development view of an inner peripheral surface of the outer joint member, for illustrating a difference given by inclination directions of the track grooves between ranges in which the torque transmission balls lose contacts with the track grooves of the outer joint member of FIG. 8. A right side of a center line extending in the up-and-down direction of the drawing sheet of FIG. 9 is an illustration of a state in which the ball 4 comes off the track groove 7A, and a left side thereof is an illustration of a state in which the ball 4 comes off the track groove 7B. The outline arrow of FIG. 9 indicates a direction of applying torque from the inner joint member 3 to the outer joint member 2. The outline arrow of FIG. 11 or FIG. 14 to be described later similarly indicates the torque applying direction.

The track grooves 7 are inclined with respect to the axis. Thus, in accordance with the torque applying direction indicated in FIG. 9, the ball 4 is brought into contact with the track groove 7A at a position displaced toward the back side with respect to the center Ob of the ball 4, and the ball 4 is brought into contact with the track groove 7B at a position displaced toward the opening side with respect to the center Ob of the ball 4. Accordingly, the surface position 4ao of the ball 4 arrives at the end of the contact locus CLo of the track groove 7A (edge portion of the inlet chamfer 20) so that the ball 4 is at the phase angle $\varphi 2_A$ at which the ball 4 loses a contact. Meanwhile, the surface position 4ao of the ball 4 arrives at the end of the contact locus CLo of the track groove 7B (edge portion of the inlet chamfer 20) so that the ball 4 is at the phase angle $\varphi 2_B$ at which the ball 4 loses a contact. Accordingly, a difference is made between the phase angles $\varphi 2_A$ and $\varphi 2_B$.

The same reason applies to the phase angle $\varphi 1$ at which the ball 4 returns to the track groove 7 to start a contact state, and hence a development view is omitted. However, as illustrated in FIG. 8, at the phase angle $\varphi 1_A$ (see FIG. 8), the surface position 4ao of the ball 4 returns to the end of the contact locus CLo of the track groove 7A (edge portion of the inlet chamfer 20) to start a contact state. Meanwhile, at the phase angle $\varphi 1_B$ (see FIG. 8), the surface position 4ao of the ball 4 returns to the end of the contact locus CLo of the track groove 7B (edge portion of the inlet chamfer 20) to start a contact state. As a result, when the fixed type constant velocity universal joint 1 taking the maximum operating angle is rotated in the counterclockwise direction, as illustrated in FIG. 8, the range $M_A$ in which the ball 4 loses a contact with the track groove 7A is smaller than the range $M_B$ in which the ball 4 loses a contact with the track groove 7B. In contrast, when the fixed type constant velocity universal joint 1 is rotated in the clockwise direction, conversely to the case described above, the range $M_A$ in which the ball 4 loses a contact with the track groove 7A is larger than the range $M_B$ in which the ball 4 loses a contact with the track groove 7B.

As described above, when the fixed type constant velocity universal joint 1 according to this embodiment takes the maximum operating angle, the ball 4 located around the phase angle $\varphi 0$, which moves toward the opening side of the track groove 7 of the outer joint member 2, comes off the opening-side end portion (inlet chamfer 20) of the track groove 7 of the outer joint member 2 and loses a contact with the track groove 7, and the ball 4 comes off the back-side end portion of the track groove 9 of the inner joint member 3 and loses a contact with the track groove 9. However, as illustrated in FIG. 6a, the ball 4 located at the phase angle ($\varphi=180°$), which is opposed in a diameter direction to the ball 4 located around the phase angle $\varphi 0$, is set to have a contact on the back side of the track groove 7 of the outer joint member 2, and have a contact on the opening side of the track groove 9 of the inner joint member 3. With this setting, the number of the balls 4 that bear load is increased, and a balance of internal forces is improved, thereby being capable of maintaining strength and durability.

The characteristic configuration (1) of the fixed type constant velocity universal joint according to this embodiment is summarized below. Through use of the fixed type constant velocity universal joint of the cross track groove type as a base, the fixed type constant velocity universal joint according to this embodiment has the operation mode in which the ball loses a contact when the maximum operating angle is taken. Thus, even at the large operating angle at which the ball 4 loses a contact with the track groove 7 of the outer joint member 2, as compared to the related-art axial track offset type, the moment and the forces applied to the cage 5 by the balls 4 act so as to be balanced, and hence the cage 5 is not significantly displaced from the bisecting plane. Accordingly, reduction in constant velocity characteristic and transmission efficiency, and changes of internal forces can be minimized.

Further, when torque is applied in a range in which the balls are brought into a contact state with respect to the track grooves, that is, a range of a normal operating angle having a small angle and a range of from a medium angle to a large angle, owing to the structure in which the balls basically generate forces to push the cage in opposite directions in the adjacent track grooves, the moment and the forces applied to the cage by the balls are balanced. In the range of from the medium angle to the large angle, there are variations in magnitude of contact forces between each ball and the track groove of the outer joint member and between each ball and the track groove of the inner joint member. However, as compared to the related-art axial track offset type, the moment and the forces applied to the cage by the balls are balanced, and hence the cage is stable near the bisecting plane, thereby being capable of obtaining a satisfactory constant velocity characteristic and transmission efficiency.

Next, with reference to FIGS. 10 to FIG. 15, description is made of the characteristic configuration (2) of the fixed type constant velocity universal joint according to this embodiment, that is, a configuration in which, when the large operating angle is taken, the operating angle $\theta 2$ at which the ball 4 loses a contact with the track groove 9 of the inner joint member 3 is set to be larger than the operating angle $\theta 1$ at which the ball 4 loses a contact with the track groove 7 of the outer joint member 2.

Figure 11:
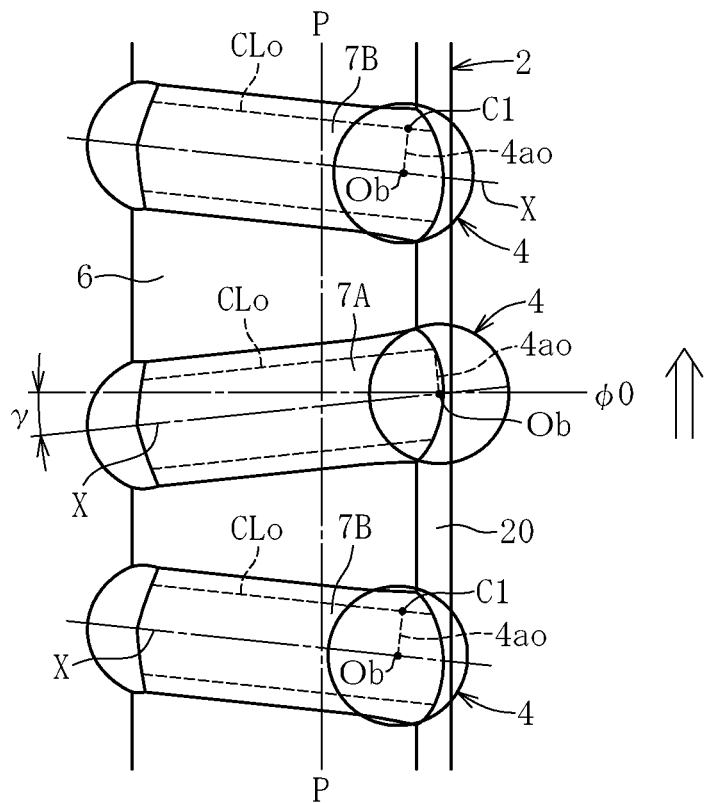
FIG. 11 is a development view of the inner peripheral surface of the outer joint member, for illustrating a state in which the torque transmission ball loses a contact with the track groove of the outer joint member of FIG. 10.
Figure 12:
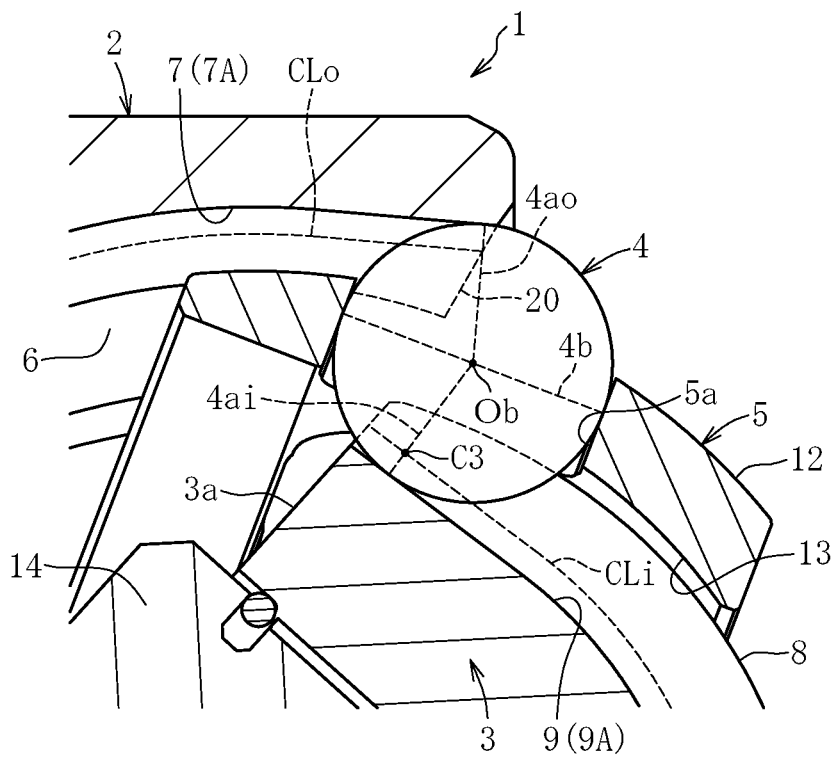

FIG. 10a is a longitudinal sectional view for illustrating a state in which the torque transmission ball loses a contact with the track groove of the outer joint member when the fixed type constant velocity universal joint of FIG. 1a and FIG. 1b takes a large operating angle. FIG. 10b is a right-side view of FIG. 10a. FIG. 11 is a development view of the inner peripheral surface of the outer joint member, for illustrating a state in which the torque transmission ball loses a contact with the track groove of the outer joint member of FIG. 10b. FIG. 12 is an enlarged longitudinal sectional view for illustrating the portion F of FIG. 10a.

First, description is made of the operating angle $\theta 1$ at which the ball 4 loses a contact with the track groove 7 of the outer joint member 2. As illustrated in FIG. 10a and FIG. 10b, when the fixed type constant velocity universal joint 1 according to this embodiment takes a large operating angle, the ball 4 moves toward the opening side of the track groove 7 of the outer joint member 2, and arrives at the edge portion of the inlet chamfer 20 of the track groove 7 so that the ball 4 loses a contact with the track groove 7 of the outer joint member 2. The operating angle at which the ball loses a contact corresponds to the operating angle $\theta 1$ at which the ball 4 loses a contact with the track groove 7 of the outer joint member 2.

A positional relationship between the track grooves 7 of the outer joint member 2 and the balls 4 at the time of the operating angle $\theta 1$ is described in detail with reference to FIG. 11 and FIG. 12. When the intermediate shaft 14 illustrated in FIG. 10b is rotated in the direction (counterclockwise direction) indicated by the arrow, as illustrated in FIG. 11, a load range between the ball 4 and the track groove 7A or the track groove 7B is the contact locus CLo on the upper side of the drawing sheet of FIG. 11. FIG. 11 is an illustration of a state in which, among the balls 4 located in the track grooves 7A, the center Ob of the ball 4, which has moved to an end position in the axial direction toward the opening side of the outer joint member 2, is located at the phase angle $\varphi 0$. Under this state, as illustrated in FIG. 11 and FIG. 12, the surface position 4ao of the ball 4 located in the track groove 7A arrives at an opening-side end of the contact locus CLo, that is, the edge portion of the inlet chamfer 20 so that the fixed type constant velocity universal joint 1 takes the operating angle $\theta 1_A$ at which the ball 4 loses a contact with the track groove 7A. Although illustration is omitted, the same holds true for a case of the track groove 7B. Under a state in which, among the balls 4 located in the track grooves 7B, the center Ob of the ball 4, which has moved to an end position in the axial direction toward the opening side of the outer joint member 2, is located at the phase angle φ0, the surface position 4ao of the ball 4 located in the track groove 7B arrives at an opening-side end of the contact locus CLo, that is, the edge portion of the inlet chamfer 20 so that the fixed type constant velocity universal joint 1 takes the operating angle $θ1_B$ at which the ball 4 loses a contact with track groove 7B.

Regarding the operating angle θ1 at which the ball 4 loses a contact with the track groove 7 of the outer joint member 2, when the center Ob of the ball 4 is located at the phase angle φ0, the ball 4 moves to the end position in the axial direction toward the opening side of the outer joint member 2. Accordingly, the operating angle θ1 is defined as an operating angle at which the ball 4 loses a contact when the center Ob of the ball 4 is located at the phase angle φ0. Further, the operating angles $θ1_A$ and $θ1_B$ are collectively referred to as "the operating angle θ1". In Description and Claims, a phrase of "an operating angle (θ1) at which the torque transmission ball loses a contact with the track groove of the outer joint member" is used with the meaning described above.

As illustrated in FIG. 11, at the time of the operating angle $θ1_A$ at which the ball 4 located in the track groove 7A loses a contact with the track groove 7A, the track grooves 7B and the balls 4 that are located at the phase angle apart from the phase angle φ0 are in a contact state at the contacts C1, and bear load.

Further, at a point in time when the ball 4 loses a contact with the track groove 7A of the outer joint member 2, as illustrated in FIG. 12, the surface position 4ai of the ball 4 is within an axial range of the contact locus CLi of the track groove 9A of the inner joint member 3, and the track groove 9A and the ball 4 are in a contact state at the contact C3. Accordingly, at the point in time when the ball 4 loses a contact with the track groove 7A of the outer joint member 2 and when the ball 4 located with the same positional relationship returns to the track groove 7 of the outer joint member 2, the ball 4 can bear load on the track groove 9 of the inner joint member 3.

Regarding the operating angle θ1 at which the ball 4 loses a contact with the track groove 7 of the outer joint member 2, similarly to the above description of the phase angles $φ1_A$, $φ1_B$, $φ2_A$, and $φ2_B$ and the ranges $M_A$ and $M_B$ at the time of the maximum operating angle, in the track groove 7B having the inclination direction opposite to that of the track groove 7A, due to a length difference in the contact locus CLo, there is a slight difference between the operating angles $θ1_A$ and $θ1_B$. Specifically, when the fixed type constant velocity universal joint is rotated in the counterclockwise direction, a relation of $θ1_A > θ1_B$ is satisfied. When the fixed type constant velocity universal joint is rotated in the clockwise direction, a relation of $θ1_A < θ1_B$ is satisfied. However, in both the rotating directions, a difference between $θ1_A$ and $θ1_B$ is about 0.5°. The phrase of "the operating angle (θ1) at which the torque transmission ball loses a contact with the track groove of the outer joint member" described in Description and Claims also encompasses the meaning described above.

Figure 13B:
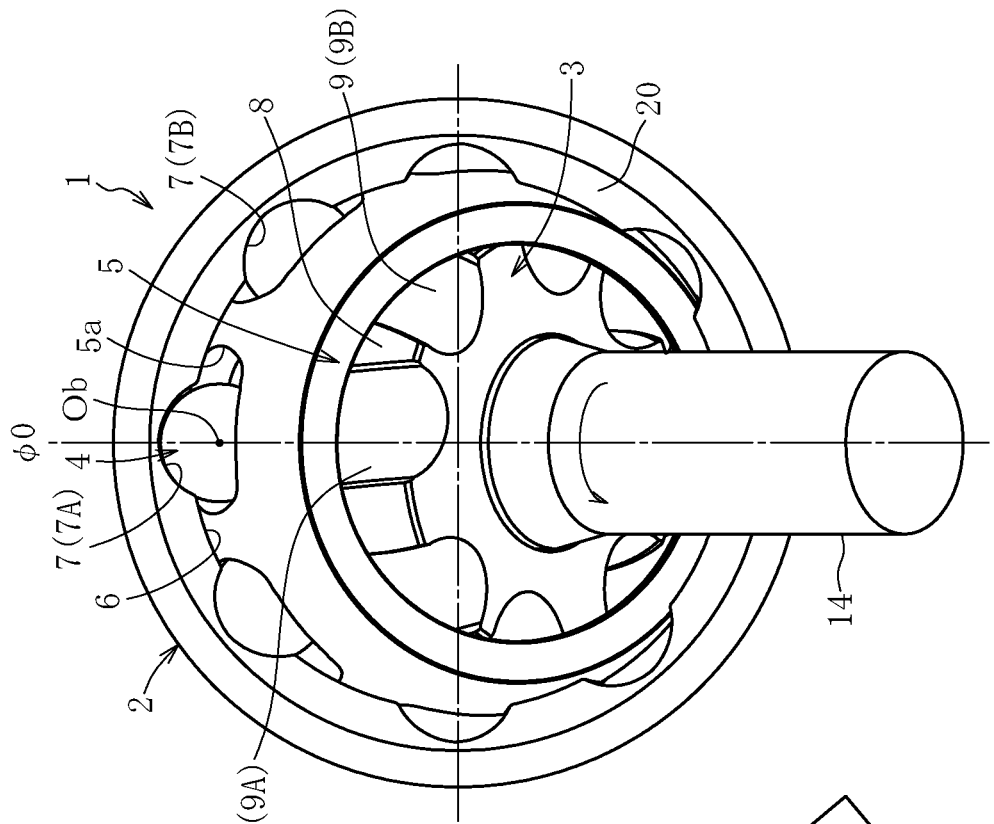
Figure 13A:
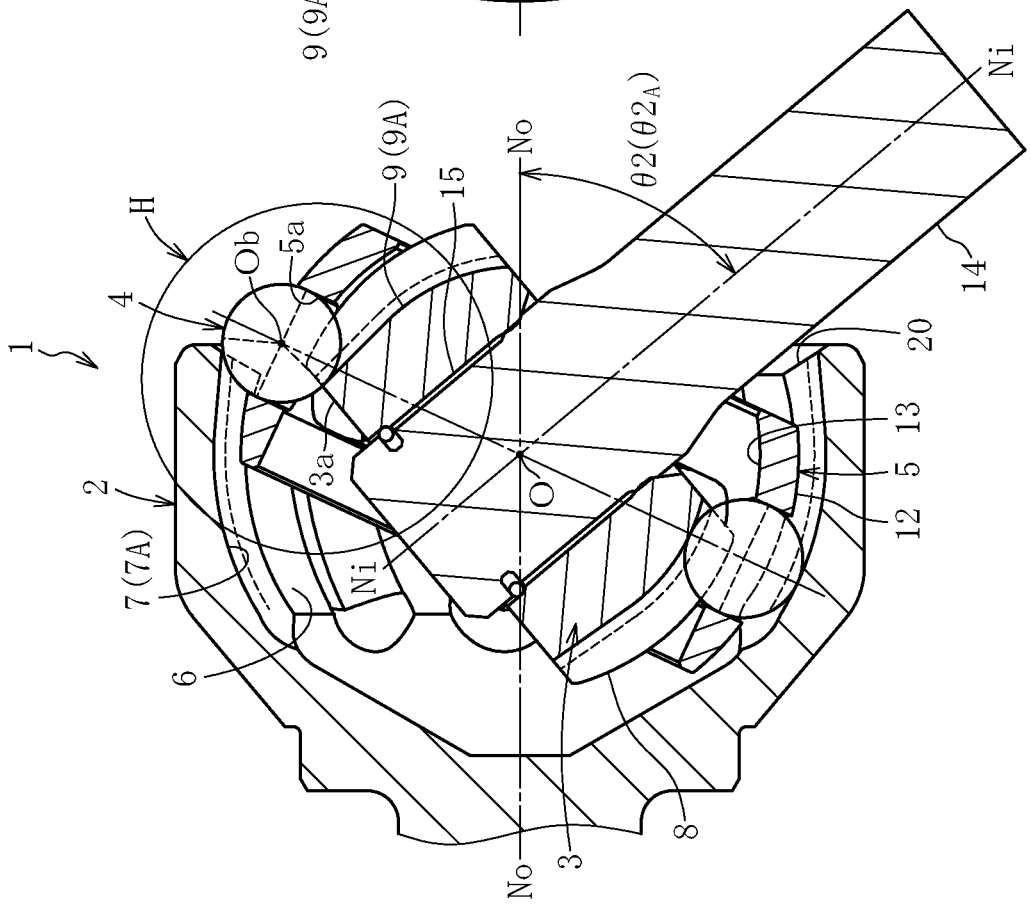
FIG. 13a is a longitudinal sectional view for illustrating a state in which the torque transmission ball loses a contact with the track groove of the inner joint member when the fixed type constant velocity universal joint of FIG. 1a and FIG. 1b takes a large operating angle.
Figure 14:
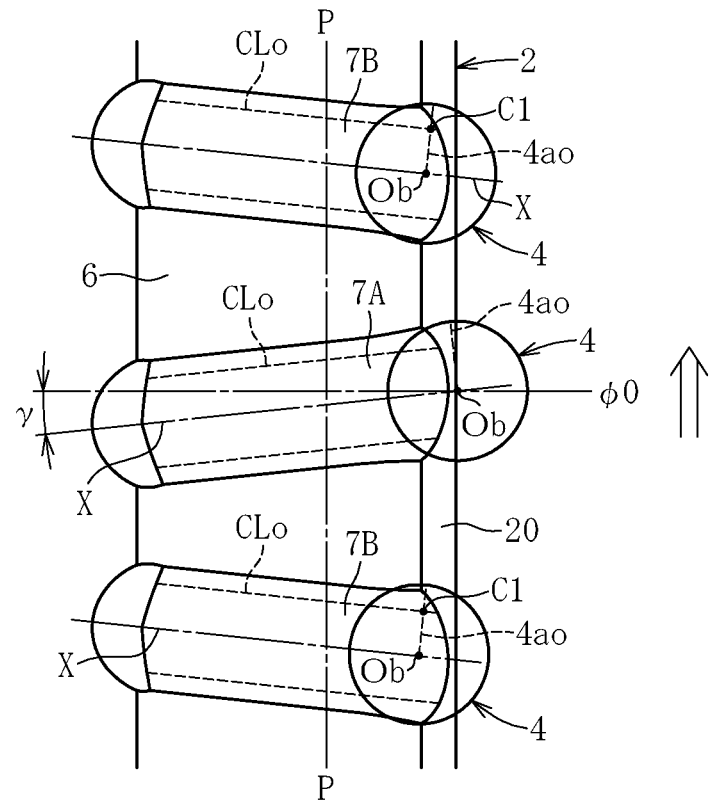
FIG. 14 is a development view of the inner peripheral surface of the outer joint member, for illustrating a positional relationship among the track grooves of the outer joint member and the torque transmission balls when the operating angle illustrated in FIG. 13a and FIG. 13b is taken.
Figure 15:
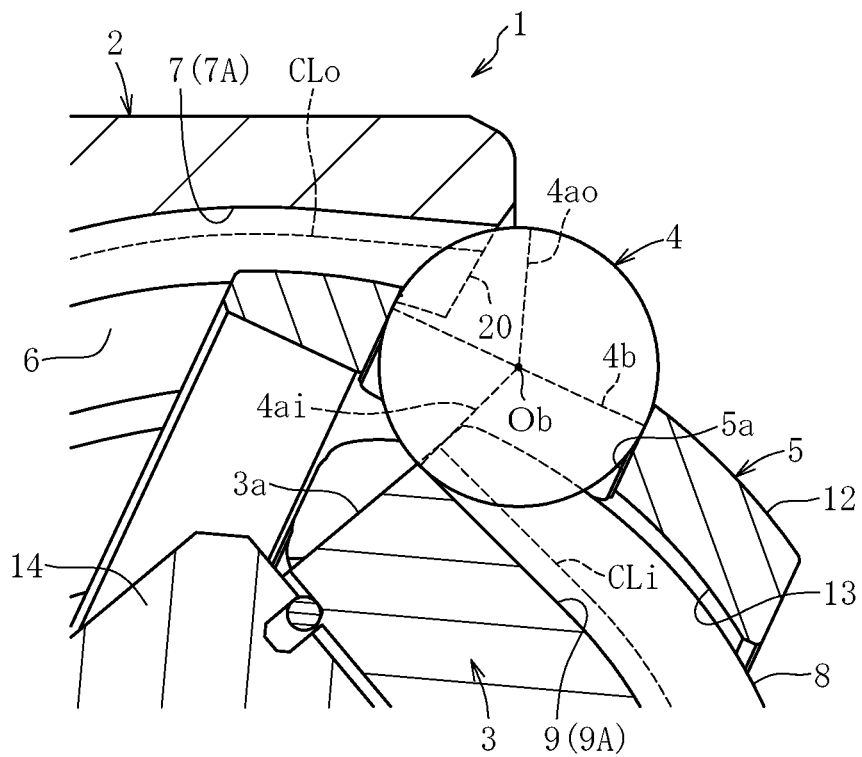

Next, with reference to FIGS. 13 to FIG. 15, description is made of the operating angle θ2 at which the ball loses a contact with the track groove of the inner joint member. FIG. 13a is a longitudinal sectional view for illustrating a state in which the torque transmission ball loses a contact with the track groove of the inner joint member when the fixed type constant velocity universal joint of FIG. 1a and FIG. 1b takes a large operating angle. FIG. 13b is a right-side view of FIG. 13a. FIG. 14 is a development view of the inner peripheral surface of the outer joint member, for illustrating a positional relationship between the track groove of the outer joint member and the torque transmission ball when the fixed type constant velocity universal joint takes the operating angle in FIG. 13b. FIG. 15 is an enlarged longitudinal sectional view for illustrating the portion H of FIG. 13a.

When the fixed type constant velocity universal joint takes an operating angle larger than the operating angle θ1 at which the ball 4 loses a contact with the track groove 7 of the outer joint member 2, as illustrated in FIG. 13a and FIG. 13b, the ball 4 moves further to the back side of the track groove 9 of the inner joint member 3. The contact locus CLi ends at the back-side end portion 3a of the inner joint member 3. When the surface position 4ai of the ball 4 arrives at the end of the contact locus CLi, the ball 4 loses a contact with the track groove 9 of the inner joint member 3. The operating angle at which the ball 4 loses a contact corresponds to the operating angle θ2 at which the ball 4 loses a contact with the track groove 9 of the inner joint member 3.

A positional relationship between the track grooves 9 of the inner joint member 3 and the balls 4 at the time of the operating angle θ2 is described in detail with reference to FIG. 15. When the intermediate shaft 14 illustrated in FIG. 13b is rotated in the direction (counterclockwise direction) indicated by the arrow, a load range between the ball 4 and the track groove 7A or the track groove 7B is the contact locus CLi on the upper side of the drawing sheet of FIG. 14. FIG. 15 is an illustration of a state in which, when the surface position 4ai of the ball 4, which has lost a contact with the track groove 7A of the outer joint member 2, arrives at the end of the contact locus CLi and the ball 4 loses a contact with the track groove 9A of the inner joint member 3, the center Ob of the ball 4 at this time is located at the phase angle φ0. The operating angle under this state corresponds to an operating angle $θ2_A$ at which the ball 4 loses a contact with the track groove 9A of the inner joint member 3.

Although illustration is omitted, the same holds true for a case of the track groove 9B. When the surface position 4ai of the ball 4, which has lost a contact with the track groove 7B of the outer joint member 2, arrives at the end of the contact locus CLi and the ball 4 loses a contact with the track groove 9B of the inner joint member 3, the center Ob of the ball 4 at this time is located at the phase angle φ0. The operating angle under this state corresponds to an operating angle $θ2_B$ at which the ball 4 loses a contact with the track groove 9B of the inner joint member 3. The operating angle θ2 at which the ball 4 loses a contact with the track groove 9 of the inner joint member 3 is also defined as the operating angle at which the ball 4 loses a contact when the center Ob of the ball 4 is located at the phase angle φ0. Further, the operating angles $θ2_A$ and $θ2_B$ are collectively referred to as "operating angle θ2". In Description and Claims, a phrase of "an operating angle (θ2) at which the torque transmission ball loses a contact with the track groove of the inner joint member" is used with the meaning described above.

Similarly to the above-mentioned operating angles $θ1_A$ and $θ1_B$ at which the ball loses a contact with the track groove of the outer joint member, in the track groove 9B having the inclination direction opposite to that of the track groove 9A, due to a length difference in the contact locus CLi, there is also a slight difference between the operating angles $θ2_A$ and $θ2_B$ at which the ball 4 loses a contact with the track groove 9 of the inner joint member 3. Specifically, when the fixed type constant velocity universal joint is rotated in the counterclockwise direction, a relationship of $\theta2_A > \theta2_B$ is satisfied. When the fixed type constant velocity universal joint is rotated in the clockwise direction, a relationship of $\theta2_A < \theta2_B$ is satisfied. However, in both the rotating directions, a difference between $\theta2_A$ and $\theta2_B$ is about 0.5°. The phrase of "the operating angle (θ2) at which the torque transmission ball loses a contact with the track groove of the inner joint member" described in Description and Claims also encompasses the meaning described above.

In the fixed type constant velocity universal joint 1 according to this embodiment, the operating angle θ2 at which the torque transmission ball 4 loses a contact with the track groove 9 of the inner joint member 3 is set to be larger than the operating angle θ1 at which the torque transmission ball 4 loses a contact with the track groove 7 of the outer joint member 2. With this setting, when the ball 4, which has come off the track groove 7 of the outer joint member 2 and lost a contact, returns to the track groove 7 again to start a contact state, the ball 4 retained in the pocket 5a of the cage 5 is guided to the track groove 9 of the inner joint member 3. Thus, the ball 4 can smoothly return to the track groove 7 of the outer joint member 2. That is, when the ball 4 returns to the track groove 7 of the outer joint member 2, the load of the ball 4 can be borne on the track groove 9 of the inner joint member 3. Accordingly, without increasing the internal forces, damage to the opening-side end portion of the outer joint member 2 can be prevented, thereby being capable of improving strength and durability.

A minimum value of a difference between the operating angle θ2 at which the torque transmission ball 4 loses a contact with the track groove 9 of the inner joint member 3 and the operating angle θ1 at which the torque transmission ball 4 loses a contact with the track groove 7 of the outer joint member 2 is set to 3°. A maximum value of the difference is set to an angle at which the ball 4 can keep a contact with a radially outer side of the cage. When the minimum value is set to be smaller than three degrees, there is a fear in that a contact ellipse between the ball 4 and the track groove 9 of the inner joint member 3 climbs on the back-side end portion 3a (see FIG. 12) of the track groove 9. Meanwhile, when the maximum value is set to an angle larger than the angle at which the ball 4 can keep a contact with the radially outer side of the cage 5, there is a risk in that the ball 4 is not retained in the pocket 5a of the cage 5 and noise is generated.

The characteristic configuration (2) of this embodiment described above is summarized below. When the ball 4, which has come off the track groove 7 of the outer joint member 2 and lost a contact, returns to the track groove 7 of the outer joint member 2, the load of the ball 4 can be borne on the track groove 9 of the inner joint member 3. Accordingly, without increasing the internal forces, damage to the opening-side end portion of the outer joint member 2 can be prevented, thereby being capable of improving strength and durability.

As described above, the fixed type constant velocity universal joint 1 according to this embodiment has the operation mode in which, when the maximum operating angle is taken, the ball loses a contact in the fixed type constant velocity universal joint of the cross track groove type. Thus, even at the large operating angle at which the ball 4 loses a contact with the track groove 7 of the outer joint member 2, the moment and the forces applied to the cage 5 by the balls 4 act so as to be balanced, and hence the cage 5 is not significantly displaced from the bisecting plane. The characteristic configuration (2) is combined with the advantageous characteristic configuration (1) that is basically provided to the fixed type constant velocity universal joint of the cross track groove type and is capable of minimizing reduction in constant velocity characteristic and transmission efficiency, and minimizing changes of internal forces. Through the combination of the configurations, there can be achieved the fixed type constant velocity universal joint dramatically improved in constant velocity characteristic, transmission efficiency, changes of internal forces, strength, and durability.

In the embodiment described above, there is exemplified the fixed type constant velocity universal joint 1 in which the track grooves 7 of the outer joint member 2, which are inclined in the circumferential direction, each comprise the first track groove portion 7a having the arc-shaped raceway center line Xa having the curvature center at the joint center O, and the second track groove portion 7b having the linear raceway center line Xb, and in which the track grooves 9 of the inner joint member 3, which are inclined in the circumferential direction, each comprise the first track groove portion 9a having the arc-shaped raceway center line Ya having the curvature center at the joint center O, and the second track groove portion 9b having the linear raceway center line Yb. However, the present invention is not limited thereto. The present invention is also applicable to a fixed type constant velocity universal joint in which the track grooves 7 of the outer joint member 2 inclined in the circumferential direction each have, in an entire axial region thereof, the arc-shaped raceway center line X having the curvature center at the joint center O, and in which the track grooves 9 of the inner joint member 3 inclined in the circumferential direction each have, in an entire axial region thereof, the arc-shaped raceway center line Y having the curvature center at the joint center O.

The present invention is not limited to the above-mentioned embodiments. As a matter of course, the present invention can be carried out in various modes without departing from the spirit of the present invention. The scope of the present invention is defined in Claims, and encompasses equivalents described in Claims and all changes within the scope of Claims.

DESCRIPTION OF REFERENCE SIGNS 1 fixed type constant velocity universal joint
2 outer joint member
3 inner joint member
3a end portion
4 torque transmission ball
5 cage
5a pocket
6 spherical inner peripheral surface
7 track groove
7a first track groove portion
7b second track groove portion
8 spherical outer peripheral surface
9 track groove
9a first track groove portion
9b second track groove portion
12 spherical outer peripheral surface
13 spherical inner peripheral surface
20 inlet chamfer
CLo contact locus
CLi contact locus
M plane
N axis of joint
O joint center
Ob center of ball
P plane Q plane
W distance
X raceway center line
Xa raceway center line
Xb raceway center line
Y raceway center line
Ya raceway center line
Yb raceway center line
θmax maximum operating angle
θ1 operating angle at which contact is lost
θ2 operating angle at which contact is lost
φ0 phase angle
φ1 phase angle
φ2 phase angle

The invention claimed is:

1. A fixed type constant velocity universal joint, comprising:
an outer joint member, which has a plurality of track grooves being formed in a spherical inner peripheral surface of the outer joint member and extending substantially in an axial direction, and has an opening side and a back side apart from each other in the axial direction;
an inner joint member, which has a plurality of track grooves being formed in a spherical outer peripheral surface of the inner joint member and extending substantially in the axial direction so as to be opposed to the track grooves of the outer joint member;
torque transmission balls each incorporated in a pair of track grooves including one of the track grooves of the outer joint member and one of the track grooves of the inner joint member that are opposed to each other; and
a cage configured to retain the torque transmission balls in pockets, the cage comprising:
a spherical outer peripheral surface to be guided by the spherical inner peripheral surface of the outer joint member; and
a spherical inner peripheral surface to be guided by the spherical outer peripheral surface of the inner joint member,
wherein a raceway center line (X) of each of the track grooves of the outer joint member comprises at least an arc-shaped portion having a curvature center that has no offset with respect to a joint center (O) in the axial direction,
wherein a plane (M) including the raceway center line (X) of one of the track grooves of the outer joint member and the joint center (O) is inclined in a circumferential direction of the outer joint member with respect to an axis (N-N) of the fixed type constant velocity universal joint, and for each adjacent pair of the track grooves of the outer joint member adjacent to each other in the circumferential direction, an inclination direction of the plane (M) of one of the track grooves of the adjacent pair is opposite to the inclination direction of the plane (M) of another of the track grooves of the adjacent pair,
wherein a raceway center line (Y) of each of the track grooves of the inner joint member is formed so as to be mirror-symmetric with the raceway center line (X) of a paired one of the track grooves of the outer joint member with a plane (P) including the joint center (O) and being orthogonal to the axis (N-N) of the fixed type constant velocity universal joint in a state of an operating angle of 0° as a reference,
wherein, in a state of a maximum operating angle (θmax), at least a torque transmission ball of the torque transmission balls that moves most toward the opening side of the outer joint member loses contact with the track groove of the outer joint member and contact with the track groove of the inner joint member, and
wherein, in a state of an operating angle smaller than the maximum operating angle (θmax), a second operating angle (θ2) at which the torque transmission ball that moves most toward the opening side of the outer joint member starts to lose contact with the track groove of the inner joint member is larger than a first operating angle (θ1) at which the torque transmission ball that moves most toward the opening side of the outer joint member starts to lose contact with the track groove of the outer joint member.

2. The fixed type constant velocity universal joint according to claim 1,
wherein the raceway center line (X) of each of the track grooves of the outer joint member comprises the arc-shaped portion having the curvature center that has no offset with respect to the joint center (O) in the axial direction, and a portion different in shape from the arc-shaped portion,
wherein the arc-shaped portion and the portion different in shape from the arc-shaped portion are smoothly connected to each other at a connection point (J), and
wherein the connection point (J) is located more on the opening side of the outer joint member than the joint center (O).

3. The fixed type constant velocity universal joint according to claim 2, wherein the portion different in shape from the arc-portion is linear.

4. The fixed type constant velocity universal joint according to claim 1, wherein the second operating angle (θ2) at which the torque transmission ball that moves most toward the opening side of the outer joint member starts to lose contact with the track groove of the inner joint member is larger, by 3° or more, than the first operating angle (θ1) at which the torque transmission ball that moves most toward the opening side of the outer joint member starts to lose contact with the track groove of the outer joint member.

5. The fixed type constant velocity universal joint according to claim 4, wherein the second operating angle (θ2) at which the torque transmission ball that moves most toward the opening side of the outer joint member starts to lose contact with the track groove of the inner joint member is set such that the torque transmission ball that moves most toward the opening side of the outer joint member keeps contact with the pocket of the cage.

6. The fixed type constant velocity universal joint according to claim 1, wherein the number of the torque transmission balls is set to be equal to or larger than eight.

* * * * *